(12) United States Patent
Yamaguchi

(10) Patent No.: US 10,101,614 B2
(45) Date of Patent: Oct. 16, 2018

(54) LIQUID CRYSTAL DISPLAY DEVICE

(71) Applicant: Japan Display Inc., Minato-ku (JP)

(72) Inventor: Hidemasa Yamaguchi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/365,036

(22) Filed: Nov. 30, 2016

(65) Prior Publication Data

US 2017/0160574 A1    Jun. 8, 2017

(30) Foreign Application Priority Data

Dec. 4, 2015    (JP) ............................... 2015-237068

(51) Int. Cl.

| | |
|---|---|
| G02F 1/1345 | (2006.01) |
| G02F 1/1339 | (2006.01) |
| G02F 1/133 | (2006.01) |
| G02F 1/1333 | (2006.01) |
| G02F 1/1337 | (2006.01) |
| G02F 1/1368 | (2006.01) |
| G02F 1/1341 | (2006.01) |

(52) U.S. Cl.
CPC .......... *G02F 1/1339* (2013.01); *G02F 1/1337* (2013.01); *G02F 1/1345* (2013.01); *G02F 1/1368* (2013.01); *G02F 1/13306* (2013.01); *G02F 1/13338* (2013.01); *G02F 1/1341* (2013.01); *G02F 2001/13415* (2013.01); *G02F 2201/123* (2013.01); *G02F 2202/16* (2013.01)

(58) Field of Classification Search
CPC .... G02F 1/1339; G02F 1/1368; G02F 1/1337; G02F 1/13306; G02F 1/1345; G02F 1/13338; G02F 2201/123; G02F 2202/16; G02F 1/1341; G02F 2001/13415
See application file for complete search history.

(56) References Cited

U.S. PATENT DOCUMENTS

| | | | | |
|---|---|---|---|---|
| 6,222,595 B1* | 4/2001 | Zhang | ............... | G02F 1/134336 349/139 |
| 7,889,308 B2* | 2/2011 | Jeong | .................... | G02F 1/1345 349/122 |
| 2002/0005928 A1* | 1/2002 | Hanakawa | ........ | G02F 1/133555 349/149 |

(Continued)

FOREIGN PATENT DOCUMENTS

| | | |
|---|---|---|
| JP | 2009-282262 | 12/2009 |
| JP | 2013-29784 | 2/2013 |
| JP | 2014-32437 | 2/2014 |

*Primary Examiner* — Donald Raleigh
(74) *Attorney, Agent, or Firm* — Oblon, McClelland, Maier & Neustadt, L.L.P.

(57) ABSTRACT

According to one embodiment, a liquid crystal display device includes a first substrate, a second substrate, a sealant which adheres the first substrate and the second substrate, a liquid crystal layer sealed between the first substrate and the second substrate, and an alignment film. The liquid crystal display device includes a drive circuit in one of the first substrate and the second substrate, a first electrode in the other of the first substrate and the second substrate, a first conductive material inside the sealant, and a first connection which is on a seal area to project toward the second substrate and is conductive, wherein the first electrode is electrically connected to the drive circuit through the first connection and the first conductive material.

19 Claims, 17 Drawing Sheets

(56) References Cited

U.S. PATENT DOCUMENTS

| | | | |
|---|---|---|---|
| 2002/0008681 A1* | 1/2002 | Hanakawa | G02F 1/1345 345/87 |
| 2002/0054006 A1* | 5/2002 | Tsuyuki | G02F 1/1345 345/87 |
| 2006/0109222 A1* | 5/2006 | Lee | G02F 1/13338 345/88 |
| 2006/0139553 A1* | 6/2006 | Kang | G02F 1/13394 349/149 |
| 2006/0221296 A1* | 10/2006 | Fujita | G02F 1/133351 349/187 |
| 2006/0232740 A1* | 10/2006 | Shigemura | G02F 1/1339 349/153 |
| 2007/0097306 A1* | 5/2007 | Jung | G02F 1/1345 349/143 |
| 2008/0088787 A1* | 4/2008 | Yim | G02F 1/1339 349/156 |
| 2008/0170016 A1* | 7/2008 | Wada | G02F 1/1345 345/87 |
| 2008/0266495 A1* | 10/2008 | Lin | G02F 1/136259 349/106 |
| 2009/0289260 A1 | 11/2009 | Sonoda et al. | |
| 2010/0134745 A1* | 6/2010 | Lee | G02F 1/1341 349/153 |
| 2011/0080548 A1 | 4/2011 | Sonoda et al. | |
| 2011/0102696 A1* | 5/2011 | Yamazaki | G02F 1/13458 349/42 |
| 2011/0102697 A1* | 5/2011 | Koyama | G02F 1/13454 349/43 |
| 2011/0116019 A1* | 5/2011 | Hwang | G02F 1/1333 349/84 |
| 2011/0194062 A1* | 8/2011 | Lee | G02F 1/1339 349/149 |
| 2012/0004453 A1 | 1/2012 | Sonoda et al. | |
| 2012/0113365 A1* | 5/2012 | Song | G02F 1/1339 349/106 |
| 2012/0194772 A1* | 8/2012 | Moriwaki | G02F 1/1339 349/138 |
| 2012/0300145 A1 | 11/2012 | Sonoda et al. | |
| 2012/0304891 A1 | 12/2012 | Sonoda et al. | |
| 2013/0242246 A1 | 9/2013 | Sonoda et al. | |
| 2013/0329178 A1* | 12/2013 | Zhong | G02F 1/1339 349/153 |
| 2014/0036166 A1 | 2/2014 | Kurasawa et al. | |
| 2014/0267992 A1 | 9/2014 | Sonoda et al. | |
| 2014/0362324 A1* | 12/2014 | Yamazaki | G02F 1/136213 349/47 |
| 2015/0277200 A1* | 10/2015 | Baek | G02F 1/133512 349/43 |
| 2015/0301370 A1* | 10/2015 | Moriwaki | G02F 1/1339 349/42 |
| 2015/0309372 A1 | 10/2015 | Sonoda et al. | |
| 2016/0154287 A1* | 6/2016 | Lee | G02F 1/1345 349/43 |
| 2016/0291416 A1 | 10/2016 | Sonoda et al. | |
| 2017/0017109 A1* | 1/2017 | Park | G02F 1/133512 |

* cited by examiner

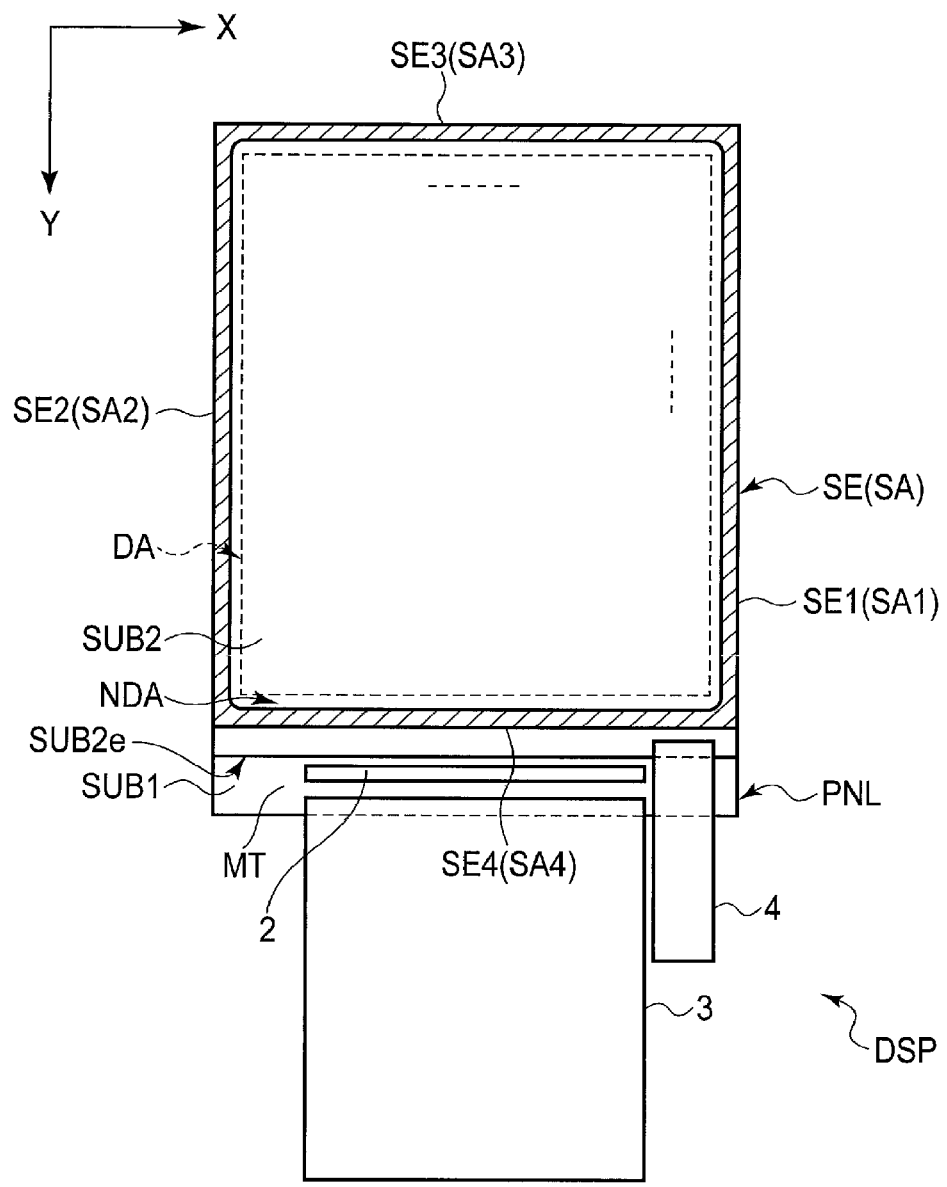
F I G. 1

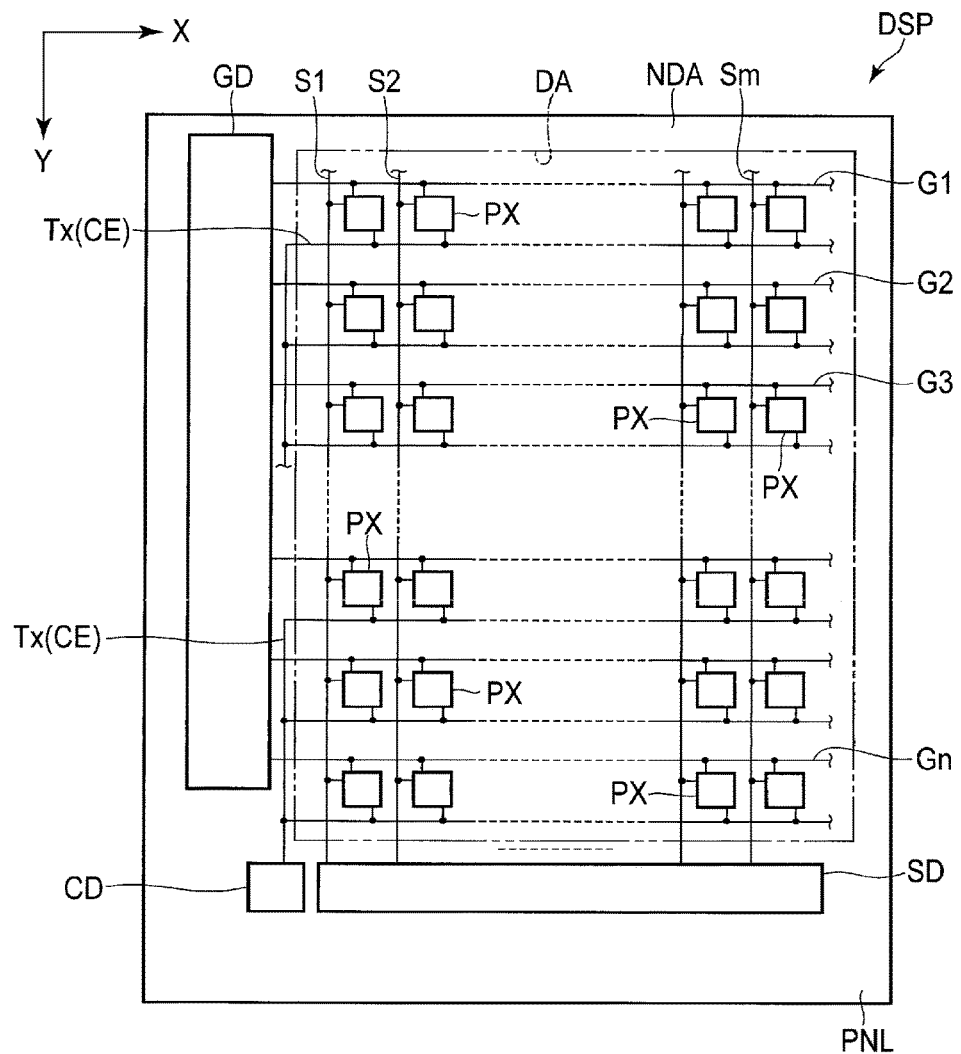
F I G. 2

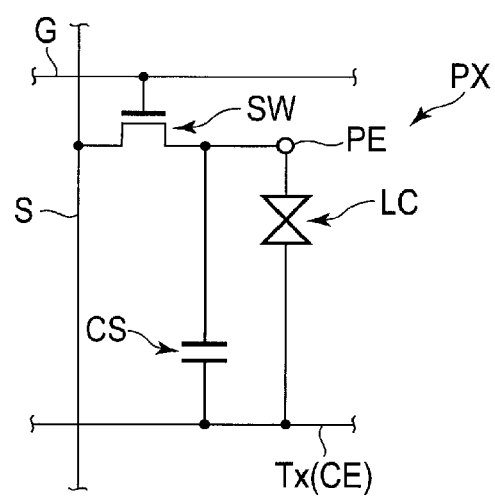
F I G. 3

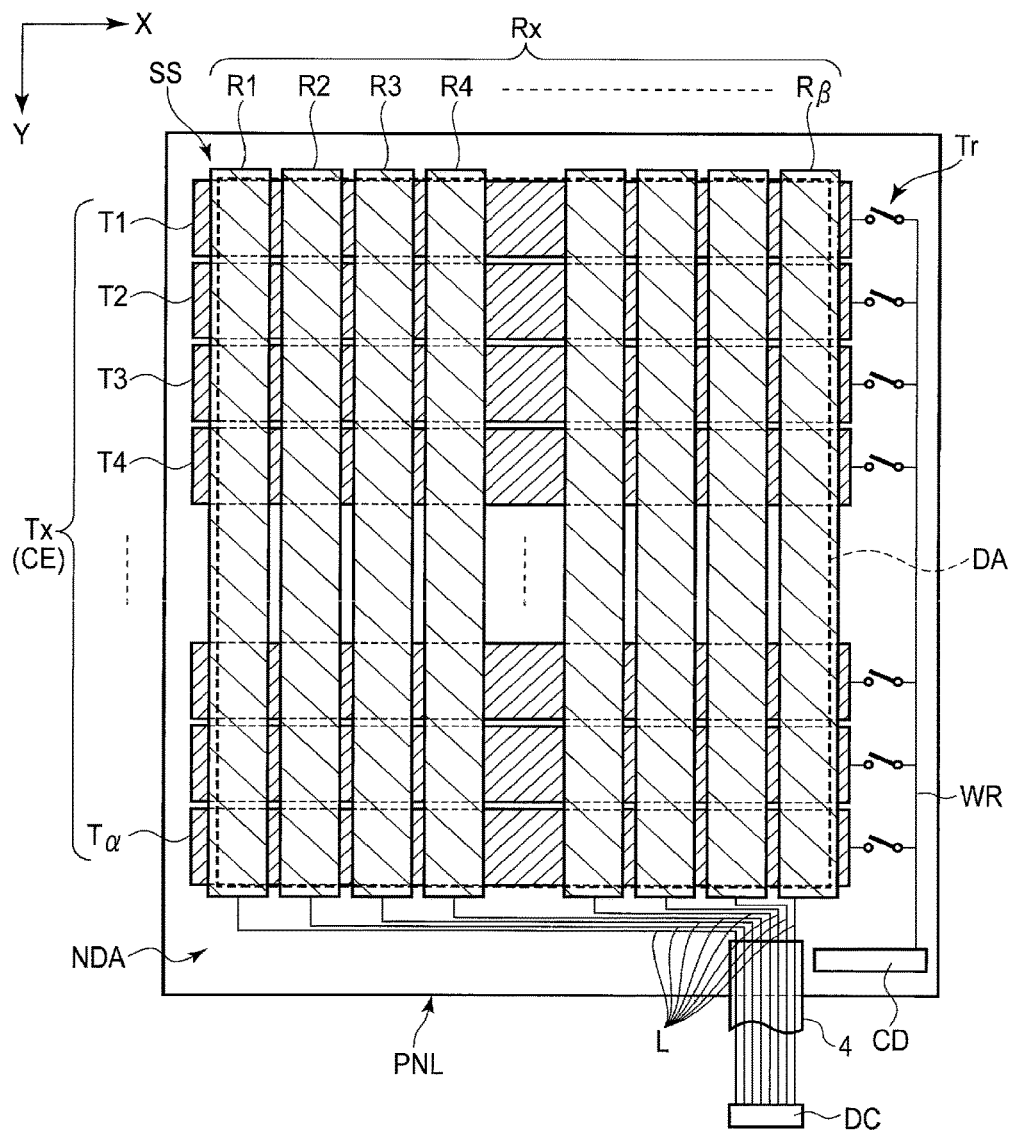
F I G. 6

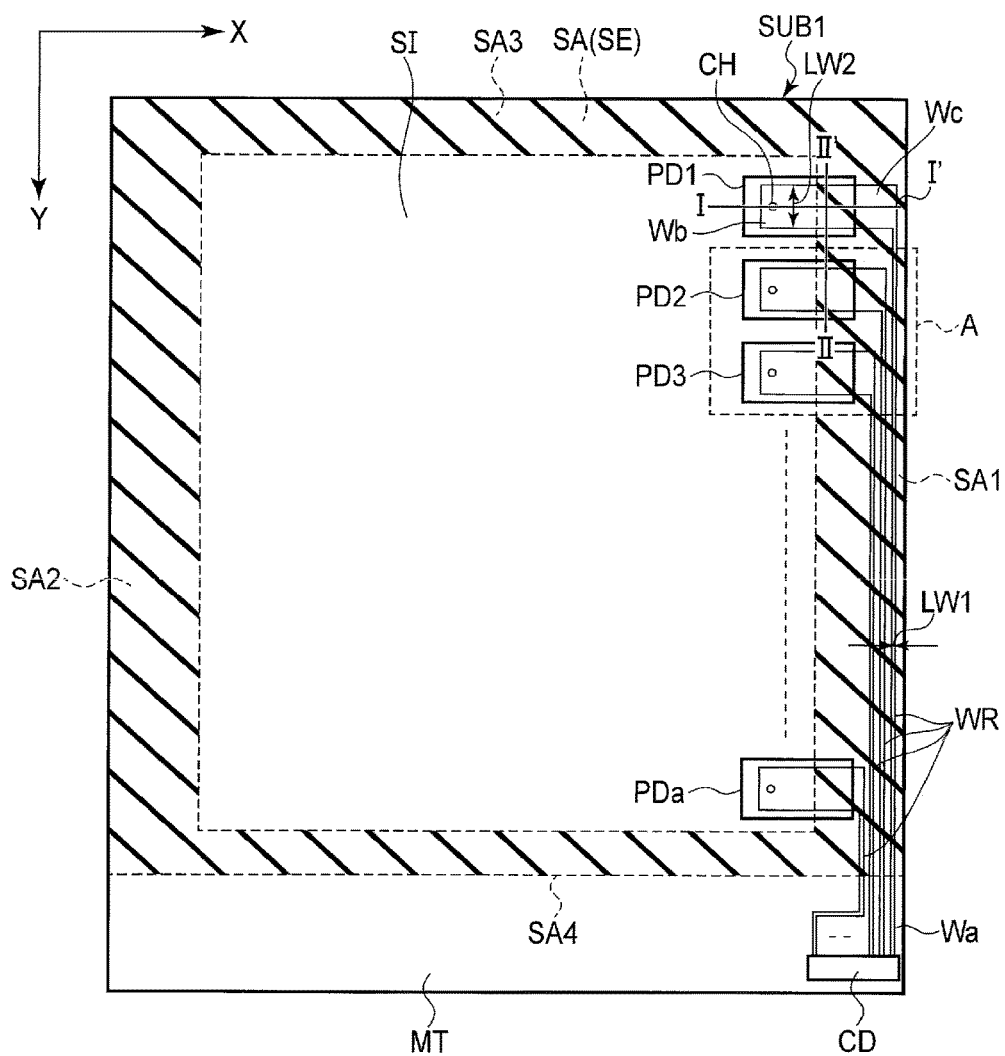
F I G. 7

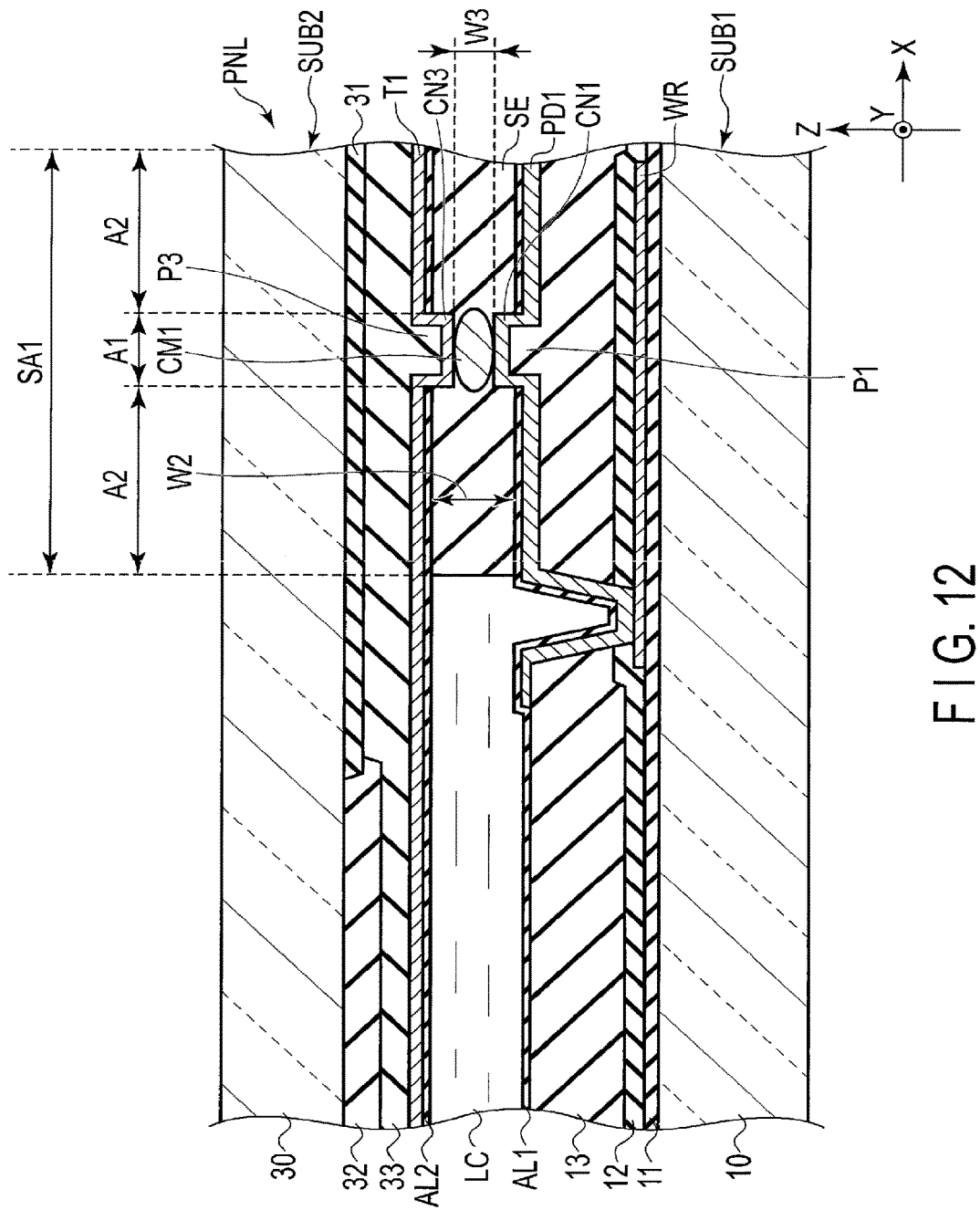
F I G. 12

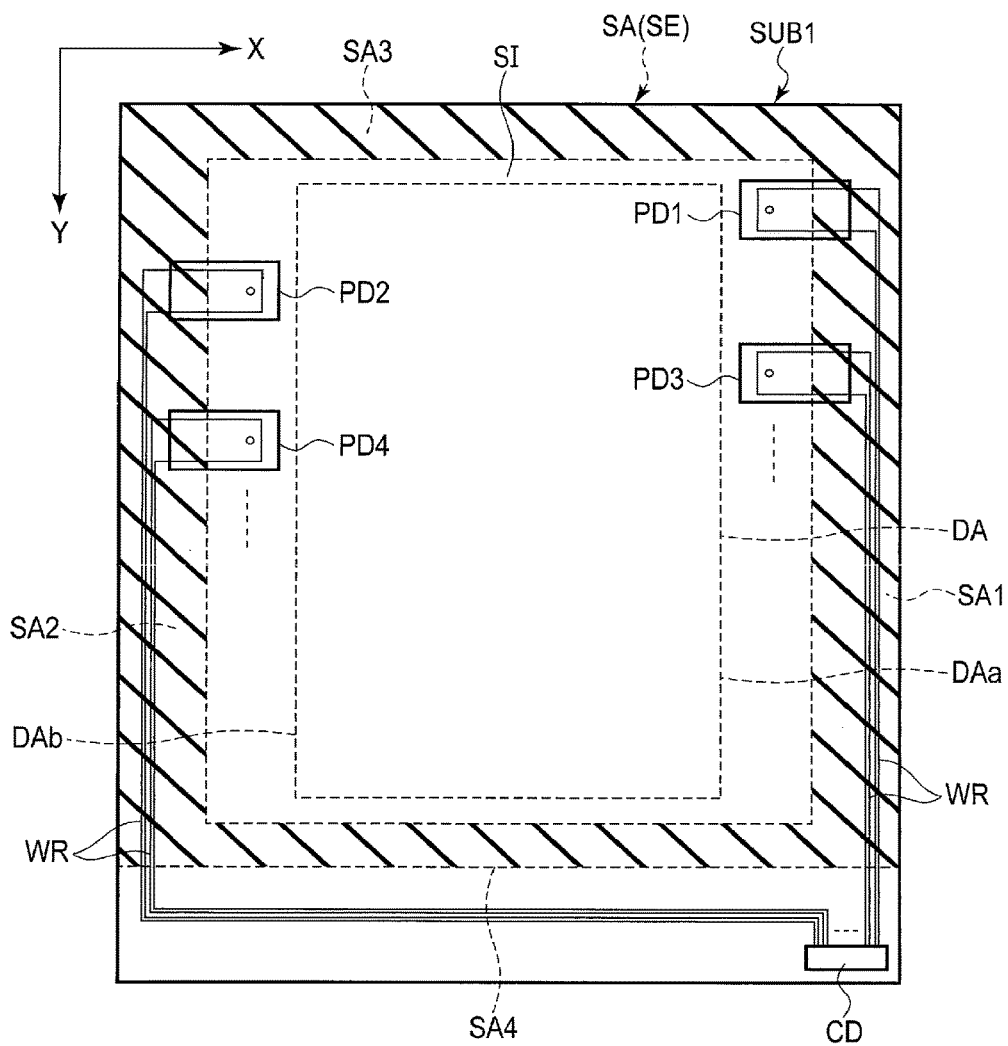
F I G. 14

LIQUID CRYSTAL DISPLAY DEVICE

CROSS-REFERENCE TO RELATED APPLICATIONS

This application is based upon and claims the benefit of priority from Japanese Patent Application No. 2015-237068, filed Dec. 4, 2015, the entire contents of which are incorporated herein by reference.

FIELD

Embodiments described herein relate generally to a liquid crystal display device.

BACKGROUND

In recent years, various kinds of display devices such as liquid crystal display devices are used in various technical fields. Liquid crystal display devices include a liquid crystal layer containing liquid crystal molecules between a pair of substrates. Furthermore, liquid crystal display devices include an alignment film on each substrate in the liquid crystal layer side for alignment control of the liquid crystal molecules. In relation to the above, for example, there is a technique of forming a thin alignment film covering spacers disposed on one of the substrates.

Sensor-equipped display devices including a sensor (or a touch panel) on a display device to detect a contact or approach of a conductive object are commercially used. As an example of such a sensor, there is a capacitance sensor which detects a position of a conductive object such as a finger on the basis of a change in capacitance. Such a capacitance sensor is composed of a detection electrode and a drive electrode, and a common electrode which is a display electrode for a display panel is also used as the drive electrode.

BRIEF DESCRIPTION OF THE DRAWINGS

FIG. 1 shows a display panel PNL of a liquid crystal display device DSP of an embodiment.

FIG. 2 shows the basic structure of the liquid crystal display device DSP of FIG. 1 and an equivalent circuit.

FIG. 3 shows an equivalent circuit of a pixel PX of FIG. 2.

FIG. 6 is a schematic plan view showing another structural example of the sensor SS of the embodiment.

FIG. 7 is a plan view showing an example of the structure of a first substrate SUB1 of the embodiment.

FIG. 12 is a cross-sectional view of the display panel PNL of a second variation of the embodiment.

FIG. 14 is a plan view of a first substrate SUB1 of a third variation of the embodiment.

DETAILED DESCRIPTION

Figure 4:
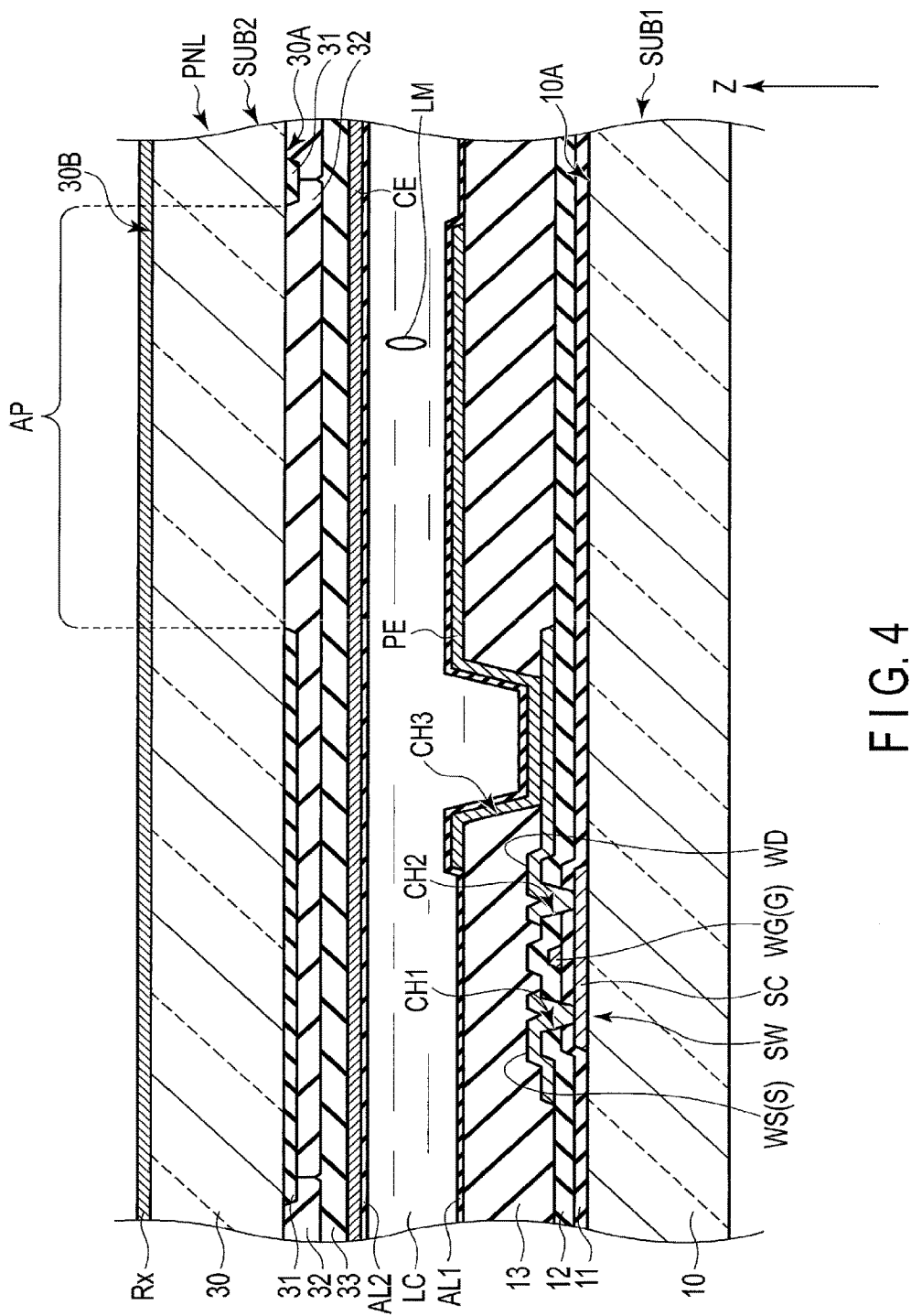
FIG. 4 is a schematic cross-sectional view of a pixel PX of the display panel PNL of FIG. 2.

In general, according to one embodiment, a liquid crystal display device includes a first substrate, a second substrate opposed to the first substrate, a sealant which adheres the first substrate and the second substrate, a liquid crystal layer sealed between the first substrate and the second substrate, and an alignment film by which liquid crystal molecules in the liquid crystal layer are aligned. The liquid crystal display device includes a drive circuit in one of the first substrate and the second substrate, a first electrode in the other of the first substrate and the second substrate, a first conductive material inside the sealant, and a first connection which is on a seal area which overlaps the sealant on the first substrate to project toward the second substrate and is conductive, wherein the first electrode is electrically connected to the drive circuit through the first connection and the first conductive material.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless necessary.

Initially, a liquid crystal display device of an embodiment will be explained in detail.

FIG. 1 shows a display panel PNL of a liquid crystal display device DSP of the present embodiment. FIG. 1 is a plan view of the display panel PNL on an X-Y plane which is defined by a first direction X and a second direction Y crossing each other.

The display panel PNL is, for example, a liquid crystal display panel including a first substrate SUB1, second substrate SUB2, sealant SE, and liquid crystal layer (liquid crystal layer LC which will be described later). The second substrate SUB2 is opposed to the first substrate SUB1. The sealant SE adheres the first substrate SUB1 and the second substrate SUB2. The sealant SE is, for example, formed as a continuous loop, and in the example depicted, the sealant SE is a rectangular frame. Specifically, the sealant SE includes four sealants SE1, SE2, SE3 and SE4. The sealants SE1 and SE2 extend in the second direction Y. The sealant SE2 and the sealant SE1 are opposed to each other with a display area DA interposed therebetween. The sealants SE3 and SE4 extend in the first direction X to be connected to the ends of the sealants SE1 and SE2. The sealant SE4 and the sealant SE3 are opposed to each other with the display area DA interposed therebetween.

Furthermore, an area in which the sealant SE is formed on the first substrate SUB1 and the second substrate SUB2 is referred to as a seal area SA. The seal area SA includes seal areas SA1 to SA4 corresponding to the positions of the sealants SE1 to SE4, respectively.

The liquid crystal layer is sealed inside the area surrounded by the sealant SE between the first substrate SUB1 and the second substrate SUB2. The display panel PNL includes the display area DA used for the image display inside the area surrounded by the sealant SE. The display area DA is, for example, formed in a substantial rectangular shape.

In the present embodiment, the liquid crystal layer is formed through, for example, one drop filling. If one drop filling is adopted, the sealant SE in a loop shape is initially applied to either the first substrate SUB1 or the second substrate SUB2 using a dispenser or a screen printing plate. Then, in a vacuum, a liquid crystal material is dropped into the area surrounded by the sealant SE. The first substrate SUB1 and the second substrate SUB2 are adhered together in a vacuum and the air is let in such that the sealant SE is pressed by a pressure difference between the inside and the outside of the first and second substrates SUB1 and SUB2. The liquid crystal material is spread between the first and second substrates SUB1 and SUB2 and a liquid crystal layer is formed in a certain cell gap. Then, the sealant SE is cured by ultraviolet irradiation or heating. The one drop filling is advantageous since the liquid crystal layer can be formed faster as compared to other manufacturing methods such as vacuum injection in which a liquid crystal material is injected between first and second substrates SUB1 and SUB2 adhered together in a vacuum.

Signal supply sources such as a drive IC chip 2 and flexible printed circuits (FPC) 3 and 4, which are used for drive of the display panel PNL, are arranged in a non-display area NDA outside the display area DA. In the example depicted, the drive IC chip 2 and the flexible printed circuit 3 is mounted on a mount MT of the first substrate SUB1, which extends outside a substrate end SUB2*e* of the second substrate SUB2. Furthermore, the flexible printed circuit 4 is mounted on the second substrate SUB2, and in the example depicted, it is mounted between the sealant SE4 and the substrate end SUB2*e* in a plan view. The non-display area NDA surrounds the display area DA, includes the seal area SA, and is formed in a rectangular frame-like shape. Note that the display area DA may be formed in, for example, a circle, ellipse, or partly-curved rectangle.

The display panel PNL of the present embodiment is, for example, of transmissive type which selectively passes light from the rear surface side of the first substrate SUB1 for image display; however, no limitation is intended thereby. The display panel PNL may be of reflective type which selectively reflects light from the front surface side of the second substrate SUB2, or may be of transflective type which functions as both the transmissive type and the reflective type. If the transmissive type or the transflective type is adopted, an illumination device is arranged in the rear surface side of the first substrate SUB1 in the display panel PNL. If the reflective type is adopted, an illumination device is not necessary in the display panel PNL; however, an auxiliary illumination device may be arranged in the front surface side of the second substrate SUB2.

FIG. 2 shows the basic structure of the liquid crystal display device DSP of FIG. 1 and an equivalent circuit. As in FIG. 2, the display panel PNL includes a gate line drive circuit GD, source line drive circuit SD, and common electrode drive circuit CD in the non-display area NDA.

The display panel PNL includes a plurality of pixels PX in the display area DA. The pixels PX are arranged in an m×n matrix in the first direction X and the second direction Y (where each of m and n is a positive integer). Furthermore, the display panel PNL includes n gate lines G (G1 to Gn), m source lines S (S1 to Sm), and common electrode CE.

The gate lines G extend in the first direction X to be drawn outside the display area DA and are connected to the gate line drive circuit GD. The source lines S extend in the second direction Y to be drawn outside the display area DA and are connected to the source line drive circuit SD. Note that the gate lines G and the source lines S may be partly bent. The common electrode CE is electrically connected to the common electrode drive circuit CD. The common electrode CE is shared by the pixels PX.

FIG. 3 shows an equivalent circuit of a pixel PX of FIG. 2.

As shown in FIG. 3, each pixel PX includes, for example, a switching element SW, pixel electrode PE, common electrode CE, and liquid crystal layer LC. The switching element SW is formed of a thin film transistor or the like and is electrically connected to a gate line G and a source line S. The pixel electrode PE is electrically connected to the switching element SW. The pixel electrode PE is opposed to the common electrode CE. The common electrode CE and the pixel electrode PE form a capacitance CS.

FIG. 4 is a schematic cross-sectional view of a pixel PX of the display panel PNL of FIG. 2. A third direction Z is orthogonal to the first direction X and the second direction Y. In the present embodiment, the positive direction of the third direction Z or the direction from the first substrate SUB1 to the second substrate SUB2 is defined as above, and the negative direction of the third direction Z or the direction from the second substrate SUB2 to the first direction SUB1 is defined as below.

The first substrate SUB1 includes, for example, a first insulating substrate 10, switching element SW, pixel electrode PE, first insulating film 11, second insulating film 12, third insulating film 13, and first alignment film AL1.

The first insulating substrate 10 is a light transmissive substrate such as a glass substrate or a resin substrate.

In the example depicted, the switching element SW is of top gate type; however, the switching element SW may be of bottom gate type. The switching element SW includes a semiconductor layer SC. The semiconductor layer SC is formed of, for example, polycrystalline silicon. The semiconductor layer SC may be instead formed of amorphous silicon or semiconductor oxide. The semiconductor layer SC is disposed on the first insulating substrate 10. The first insulating film 11 is disposed on the semiconductor layer SC and the first insulating substrate 10. Note that an additional insulating film may be interposed between the first insulating substrate 10 and the semiconductor layer SC. A gate electrode WG of the switching element SW is formed on the first insulating film 11 to be above the semiconductor layer SC. The gate electrode WG is formed integrally with the gate line G. The second insulating film 12 is disposed on the gate electrode WG and the first insulating film 11.

A source electrode WS and a drain electrode WD of the switching element SW are disposed above the second insulating film 12. The source electrode WS is formed integrally with the source line S. The source electrode WS contacts the semiconductor layer SC through a contact hole CH1 which passes through the first insulating film 11 and the second insulating film 12. The drain electrode WD contacts the semiconductor layer SC through a contact hole CH2 which passes through the first insulating film 11 and the second insulating film 12. The third insulating film 13 is disposed above the source electrode WS, drain electrode WD, and second insulating film 12.

The first insulating film 11 and the second insulating film 12 are formed of an inorganic material such as silicon oxide or silicon nitride. The third insulating film 13 is formed of, for example, a transparent resin material.

The pixel electrode PE is disposed on the third insulating film 13. The pixel electrode is formed of a transparent conductive material such as indium tin oxide (ITO) or indium zinc oxide (IZO). The pixel electrode PE contacts the drain electrode WD through a contact hole CH3 which passes through the third insulating film 13. The first alignment film AL1 is disposed on the pixel electrode PE and the third insulating film 13.

On the other hand, the second substrate SUB2 includes, for example, a second insulating substrate 30, light shielding layer 31, color filter 32, overcoat layer 33, common electrode CE, and second alignment film AL2.

The second insulating substrate 30 is a light transmissive substrate such as a glass substrate or a resin substrate. The second insulating substrate 30 includes an inner surface 30A which is opposed to the first substrate SUB1 and an outer surface 30B which is opposite to the inner surface 30A.

The light shielding layer 31 is disposed on the inner surface 30A of the second insulating substrate 30. The light shielding layer 31 is formed to define each pixel PX and each aperture AP. The light shielding layer 31 is formed to be opposed to elements formed on the first substrate SUB1 such as gate line G, source line S, switching element SW, and contact hole CH3. Although this is not detailed, the shape of the light shielding layer 31 formed to be opposed to the gate line G and the source line S is a lattice in a plan view.

The color filter 32 is disposed on the inner surface 30A of the second insulating substrate 30 such that its edges overlap the light shielding layers 31. The color filter 32 is formed of a resin material which is painted in several different colors such as red, blue, and green.

The overcoat layer 33 covers the color filter 32. The overcoat layer 33 is formed of a transparent resin material.

The common electrode CE is disposed on the overcoat layer 33 to be opposed to the first substrate SUB1. The common electrode CE is formed of a transparent conductive material such as ITO or IZO. The second alignment film AL2 covers the common electrode CE.

In the above relationship between the first substrate SUB1 and the second substrate SUB2, the first alignment film AL1 and the second alignment film AL2 are opposed to each other. The liquid crystal layer LC includes liquid crystal components including liquid crystal molecules LM sealed between the first alignment film AL1 and the second alignment film AL2. Both the first alignment film AL1 and the second alignment film AL2 exert an alignment restriction force which aligns the liquid crystal molecules LM. In this example, both the first alignment film AL1 and the second alignment film AL2 are a vertical alignment film by which the liquid crystal molecules LM are aligned to be substantially parallel to the third direction Z.

A detection electrode Rx is disposed on the outer surface 30B of the second insulating substrate 30. The detection electrode Rx is a part of the structure of a capacitance sensor which will be described later.

Note that, the display panel PNL is of vertical aligned (VA) mode. However, no limitation is intended thereby. For example, the display panel PNL may be of twisted nematic (TN) mode or optically compensated bend (OCB) mode. In that case, the first alignment film AL1 and the second alignment film AL2 are a horizontal alignment film which aligns the liquid crystal molecules LM substantially parallel to the X-Y plane.

Now, a capacitance sensor SS which is mounted on the liquid crystal display device DSP of the present embodiment will be explained.

Figure 5:
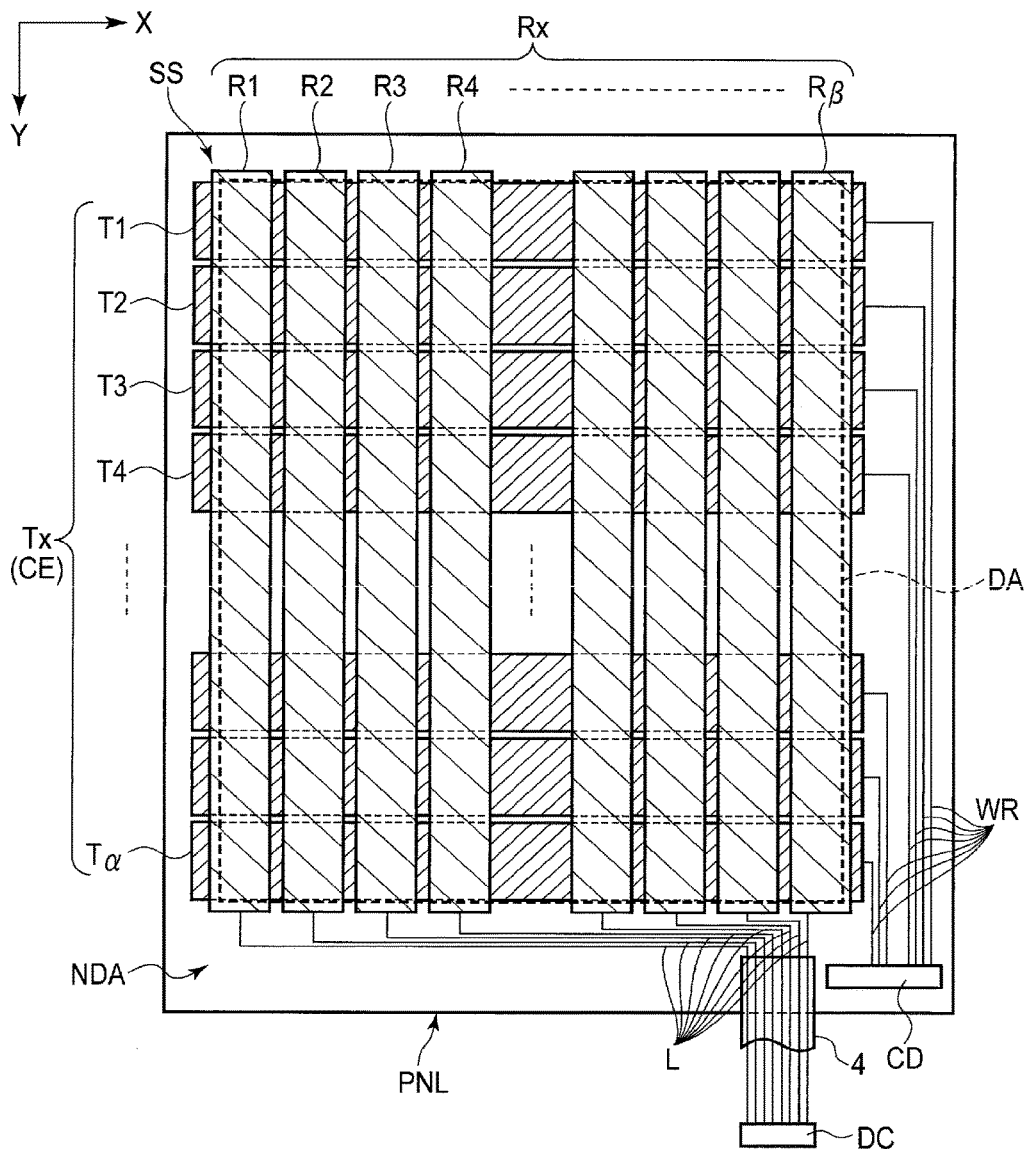
FIG. 5 is a schematic plan view showing the structure of a sensor SS of the embodiment.

FIG. 5 is a schematic plan view showing the structure of a sensor SS of the present embodiment.

In the present embodiment, the sensor SS includes sensor drive electrodes Tx, detection electrodes Rx, lead lines L, and connection lines WR. The sensor drive electrodes Tx include the common electrode CE which produces a field with the pixel electrodes PE for image display, and function as a detector of a position of an object by producing capacitance with the detection electrodes Rx.

The sensor drive electrodes Tx and the detection electrodes Rx are arranged in the display area DA. In the example depicted, the second drive electrodes Tx include a plurality of electrodes T1 to Tα (where α is a positive integer). Electrodes T1 to Tα are arranged in the display area DA in the second direction Y at intervals. Electrodes T1 to Tα are each formed in a band-like shape extending substantially linearly in the first direction X. The detection electrodes Rx include a plurality of electrodes R1 to Rβ (where β is a positive integer). Electrodes R1 to Rβ are arranged in the display area DA in the first direction X at intervals. Electrodes R1 to Rβ are each formed in a band-like shape extending substantially linearly in the second direction Y. That is, electrodes R1 to Rβ extend to cross electrodes T1 to Tα.

Note that the number, size, and shape of electrodes T1 to Tα and R1 to Rβ are not limited specifically, and are changed arbitrarily. Furthermore, electrodes T1 to Tα are arranged in the first direction X at intervals extending substantially linearly in the second direction Y while electrodes R1 to Rβ are arranged in the second direction Y extending substantially linearly in the first direction X.

The lead lines L and connection lines WR are arranged in the non-display area NDA. The lead lines L and detection electrodes Rx are disposed on the same surface (for example, the outer surface 30B of FIG. 4) in the second substrate SUB2. Lead lines L are electrically connected to electrodes R1 to Rβ one-by-one at one ends. The other ends of the lead lines L are electrically connected to the flexible printed circuit 4. A detection circuit DC is mounted on, for example, the flexible printed circuit 4. Electrodes R1 to Rβ are each electrically connected to the detection circuit DC through the lead lines L and the flexible printed circuit 4. Note that the detection circuit DC may be stored in the drive IC chip 2, or may be mounted on the flexible printed circuit 3, or may be stored in any other external device.

The connection lines WR are disposed on the first substrate SUB1. The connection lines WR are electrically connected to electrodes T1 to Tα one-by-one at one ends. The other ends of the connection lines WR are electrically connected to the common electrode drive circuit CD. Electrodes T1 to Tα are each electrically connected to the common electrode drive circuit CD. The common electrode drive circuit CD supplies common drive signals to the common electrode CE in the display drive mode in which an image is displayed and supplies sensor drive signals to the common electrode CE in the sensing drive mode in which sensing is performed.

When the above-structured sensor SS is used for the sensing, the common electrode drive circuit CD initially writes sensor drive signals in pulse form to electrode T1 to generate sensor signals corresponding to an interelectrode capacitance between electrode T1 and electrodes R1 to Rβ. Then, the detection circuit DC reads read signals indicative of a change in the sensor signals based on a change in the interelectrode capacitance from electrodes R1 to Rβ. In the same manner, sensor drive signals are written to electrodes T2 to Tα, and read signals are read from electrodes R1 to Rβ. Through this process, a position of an object can be detected. Note that the layout of the lead lines L and the connection lines WR is not limited to the example depicted. Hereinafter, another structural example of the connection lines WR will be explained.

FIG. 6 is a schematic plan view showing another structural example of the sensor SS of the embodiment. The sensor SS of FIG. 6 has only one connection line WR which is connected to the common electrode drive circuit CD. In this respect, the sensor SS of FIG. 6 is different from that of FIG. 6.

As shown in FIG. 6, the connection line WR may electrically connect the common electrode drive circuit CD and electrodes T1 to Tα through transistors Tr as switching elements. In that case, the common electrode drive circuit CD selectively supplies the sensor signals to electrodes T1 to Tα by selecting each switching element.

FIG. 7 is a plan view showing an example of the structure of the first substrate SUB1 of the embodiment. The connection lines WR, common electrode drive circuit CD, and pad PD are disposed on the first substrate SUB1. Note that, in the first substrate SUB1, the seal area SA overlapping the sealant SE is hatched in the figure. Furthermore, the area surrounded by the seal area SA will be referred to as an intra-seal area SI.

Each connection line WR is arranged along the seal area SA1. In the example depicted, each connection line WR includes an end Wa, other end Wb, and bent Wc. The connection line WR is connected to the common electrode drive circuit CD at the end We. The connection line WR extends in the second direction Y from the end Wa to the bent Wc. Furthermore, the connection line WR extends in the first direction X from the bent We to the other end Wb through both the seal area SA1 and the intra-seal area SI. The connection line WR has a line width LW2 in the second direction Y from the bent Wc to the other end Wb, which is greater than its line width LW1 in the first direction from the one end Wa to the bent Wc. The other ends Wb of the connection lines WR are arranged in the second direction Y at intervals.

Pads PD are arranged in the second direction Y at intervals. The number of pads PD corresponds to the number of electrodes T1 to Tu in the sensor drive electrodes Tx, for example. Each pad PD is arranged on both the seal area SA1 and the intra-seal area SI. Each pad PD overlaps the other end Wb of corresponding connection line WR in a plan view. As described later, each pad PD is electrically connected to its corresponding connection line WR through a contact hole CH which passes through the insulating film therebetween. In the example depicted, the contact hole CH is disposed in the intra-seal area SI; however, it may be disposed in the seal area SA1.

Figure 8:
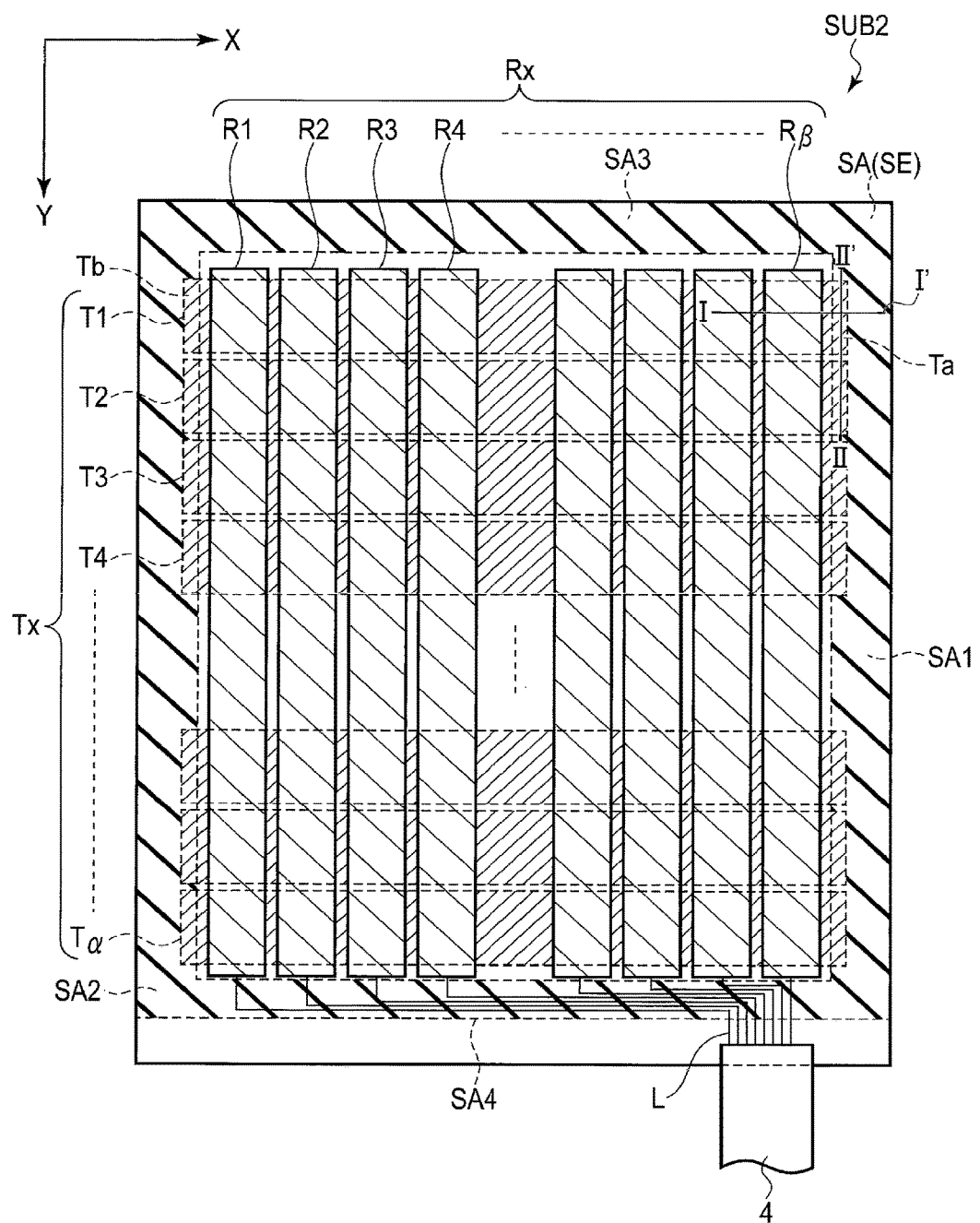
FIG. 8 is a plan view showing an example of the structure of a second substrate SUB2 of the embodiment.

FIG. 8 is a plan view showing an example of the structure of the second substrate SUB2 of the embodiment.

The detection electrodes Rx and the second drive electrodes Tx are disposed on the second substrate SUB2. Note that FIG. 8 is a plan view of the second substrate SUB2 of FIG. 4, as being viewed from the outer surface 30B side. Similarly to FIG. 7, the seal area SA overlapping the sealant SE in the second substrate SUB2 is hatched in the figure. Note that the detection electrodes Rx in the outer surface 30B side are depicted in solid lines while the sensor drive electrodes Tx in the inner surface 30A side are depicted in dotted lines.

Each of electrodes T1 to Tα in the sensor drive electrodes Tx includes an end Ta and an other end Tb. In a plan view, each end Ta overlaps the seal area SA1 and the pad PD of FIG. 7. In a plan view, each other end Tb overlaps the seal area SA2. The lead lines L are arranged along the seal area SA4.

Figure 9:
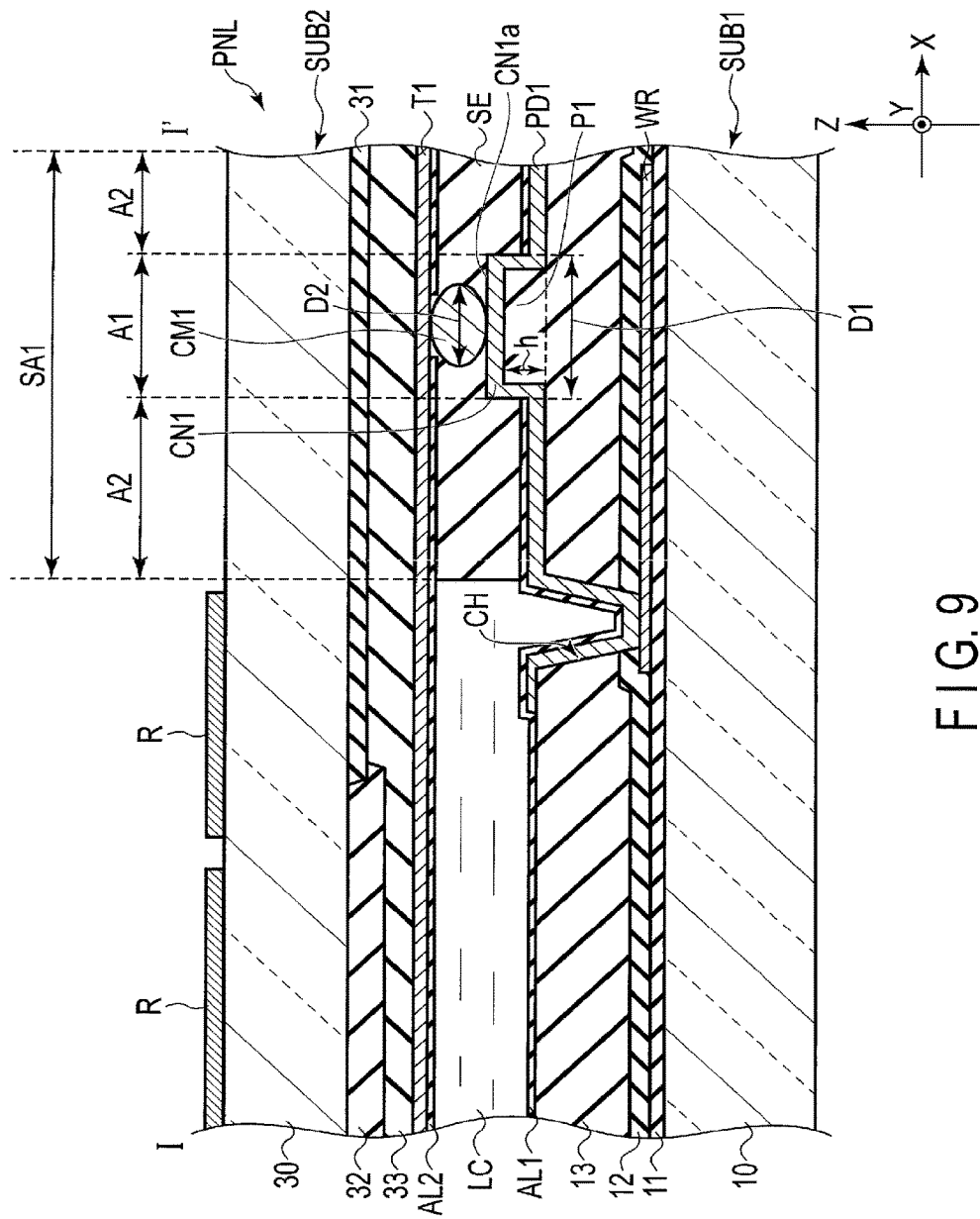
FIG. 9 is a cross-sectional view of the display panel PNL, taken along line I-I' of FIGS. 7 and 8.

FIG. 9 is a cross-sectional view of the display panel PNL, taken along line I-I' of FIGS. 7 and 8.

The connection lines WR are positioned between the first insulating film 11 and the second insulating film 12, for example. The connection lines WR can be formed of the same material used for the gate electrode WG of FIG. 4, for example. Note that, the connection lines WR may be positioned between the first insulating substrate 10 and the first insulating film 11, or may be positioned between the second insulating film 12 and the third insulating film 13.

The first substrate SUB1 includes a connection CN1 positioned in the seal area SA1. The connection CN1 projects from the first substrate SUB1 toward the second substrate SUB2 and is conductive. The connection CN1 is formed as, for example, a circle, ellipse, or polygon when the X-Y plane is viewed in a plan view.

Now, an example of the structure of the connection CN1 will be explained. The connection CN1 includes a projection P1 and a pad PD1 overlapping the projection P1. The projection P1 is a part of the third insulating film 13 in the example depicted. That is, the third insulating film 13 projects toward the second substrate SUB2 in the first area A1 in which the connection CN1 is formed than does the third insulating film 13 in the second area A2 which is a circumference of the connection CN1. Such a projection shape of the third insulating film 13 with such a form can be achieved by, for example, using a positive resist as a material for the third insulating film 13 and applying a half-tone exposure process during the formation of the third insulating film 13. That is, after forming the positive resist, the area corresponding to the projection P1 is light-shielded and the other part is exposed through a half-tone mask. Then, the positive resist is developed in a developer. At that time, only the exposed surface of the positive resist is removed by the developer. Then, the positive resist is cured to form the third insulating film 13 with the projection P1. If a steeper projection P1 is desired, the shape of the positive resist immediately after the development should be maintained. In an example, a change in the shape of positive resist by heat during the curing process can be suppressed by performing provisional curing with a temperature of 80 to 150° C. and then performing substantial curing. In the present embodiment, the projection P1 has a height of 0.5 μm or more in the third direction Z, and in this example, the height is 0.6 μm.

Here, the projection P1 is formed as a part of the third insulating film 13; however, no limitation is intended thereby. For example, the projection P1 may be formed by laminating any other insulating material or conductive material on the third insulating film 13.

The pad PD1 is positioned on the third insulating film 13. In the first area A1, the pad PD1 extends and the second area A2 in the seal area SA1 and overlaps the projection P1 in the first area A1. The pad PD1 is electrically connected to the connection line WR through the contact hole CH which passes through the second insulating film 12 and the third insulating film 13. The part of the pad PD1 overlapping the projection P1 is the connection CN1. The projection P1 may be formed as a part of the pad PD1 formed to be thicker in the first area A1 than in the second area A2.

The first alignment film AL1 extends in the seal area SA1. In the example depicted, the first alignment film AL1 is formed in the second area A2 and is not formed in the first area A1. That is, the first alignment film AL1 is not formed on the upper surface CN1a of the connection CN1.

Note that the first alignment film AL1 may be formed in the first area A1. In that case, the thickness of the first alignment film AL1 in the first area A1 is thinner than that of the first alignment film AL1 in the second area A2. At that time, the thickness of the first alignment film AL1 is, for example, 10 nm or less.

The connection CN1 is formed such that the material for the first alignment film AL1 is almost entirely removed from the upper surface CN1a. In the example depicted, the connection CN1 has a width of 5 to 20 μm in the first direction X, or preferably, 10 to 15 μm.

The electrode T1 extends in the seal area SA1 in the second substrate SUB2 to be opposed to the connection CN1. The second alignment film AL2 is not substantially formed in the seal area SA1 and is not formed to be opposed to the connection CN1.

A conductive material CM1 is conductive and is disposed in the sealant SE. The conductive material CM1 is interposed between the first area A1 and the connection CN1 contacting the both. The conductive material CM1 is longer in the first direction X than in the third direction Z. In the example depicted, the conductive material CM1 is, in the X-Z cross-section, an ellipse having its long axis in the first direction X and its short axis in the third direction Z. The cross-section of the conductive material CM1 is not limited to the example depicted. Note that, in the sealant SE, other conductive materials which are not shown are disposed. As described later, conductive materials in the second area A1 are formed differently from the conductive material CM1 in the first area A1. In an example, the conductive material is formed as a sphere which is, for example, entirely formed of a metal, or may be formed of a resin material which is coated by a metal such as nickel or gold. The conductive material CM1 is formed as, for example, a circle or an ellipse when the X-Y plane is viewed in a plan view. Furthermore, the conductive material may be formed to have certain hardness for the use of a spacer.

With the above structure, the electrode T1 is electrically connected to the connection line WR through the conductive material CM1 and the connection CN1. As shown in FIG. 7, the connection line WR is electrically connected to the common electrode drive circuit CD. That is, the electrode T1 disposed in the second substrate SUB2 is electrically connected to the common electrode drive circuit CD in the first substrate SUB1 through the connection CN1 and the conductive material CM1. Note that, in the example depicted, one conductive material CM1 is disposed on one connection CN1; however, no limitation is intended thereby, and several conductive materials CM1 may be disposed on one connection CN1. Furthermore, such a conductive material CM1 may include a plurality of projections in its circumference to engage with the connection CN1 and the electrode T1 more easily.

When the above-mentioned one drop filling is used, sometimes it is difficult to apply a sufficient pressure to the first substrate SUB1 and the second substrate SUB2 when these substrates are adhered together after the dropping of liquid crystal material to one of the substrates because of the resistance of the liquid crystal material. In the structure where the first substrate SUB1 includes the common electrode drive circuit CD and the second substrate SUB2 includes the electrode T1, the first substrate SUB1 and the second substrate SUB2 are electrically connected by a conductive material disposed therebetween; however, in such a case of insufficient pressure between the first substrate SUB1 and the second substrate SUB2, an electrical connection between the common electrode drive circuit CD and the electrode T1 may be difficult to achieve. As a possible countermeasure, the size of the conductive material may be increased; however, an inter-substrate gap in the non-display area NDA where the conductive material is arranged tends to increase under the condition where a pressure to adhere the first substrate SUB1 and the second substrate SUB2 falls short. This will cause unevenness in the cell gap between the center of the display area DA and the circumference of the display area DA in the proximity of the non-display area NDA.

In the present embodiment, the first substrate SUB1 includes the connection CN1 projecting toward the second substrate SUB2 in the seal area. Therefore, the conductive material CM1 in the sealant SE fits in between the connection CN1 and the electrode T1 and suitably crushed therebetween when a pressure is applied to the first substrate SUB1 and the second substrate SUB2 for the electric connection of the connection CN1 and the electrode T1. Since the connection CN1 is electrically connected to the common electrode drive circuit CD through the connection line WR, the electric connection between the electrode T1 and the common electrode drive circuit CD can be established securely. Therefore, a loss in the production caused by poor connection between the electrode T1 and the common electrode drive circuit CD can be suppressed.

Furthermore, since the electric connection between the common electrode drive circuit CD and the electrode T1 can be achieved without increasing the size of the conductive material CM1, unevenness in the cell, gap in the display area DA can be suppressed.

Furthermore, in the seal area SA of the first substrate SUB1, the first alignment film AL1 is not formed in the first area A1 where the connection CN1 is formed, or is formed extremely thin. Therefore, even if the liquid crystal display device DSP is formed in a thin-bezel form and the first alignment film AL1 extends in the seal area SA, the conductance between the conductive material CM1 and the connection CN1 can be achieved. Alternatively, the first alignment film AL1 may be formed in the first area A1 in the seal area SA, and in that case, the first alignment film AL1 in the first area A1 is formed thinner than that in the second area A2 in the circumference of the connection CN1. Thus, the conductive material CM1 pierces through the first alignment film AL1 when the first substrate SUB1 and the second substrate SUB2 are pressed for the adhesion, and thus, the conductance between the conductive material CM1 and the connection CN1 can be achieved. Therefore, a loss in the production can be suppressed.

Here, an example of a dimensional relationship between the connection and the conductive material will be explained. The maximum diameter D1 of the connection CN1 in the first direction X is 0.5 times or more and 10 times or less the maximum diameter D2 of the conductive material CM1 in the first direction X. In this relationship, some of the conductive materials in the sealant SE are securely introduced between the connection CN1 and the electrode T1 as shown, and the electric connection therebetween can be achieved while the gap in the display area DA is maintained evenly.

Now, a specific example of the present embodiment will be explained.

Figure 10:
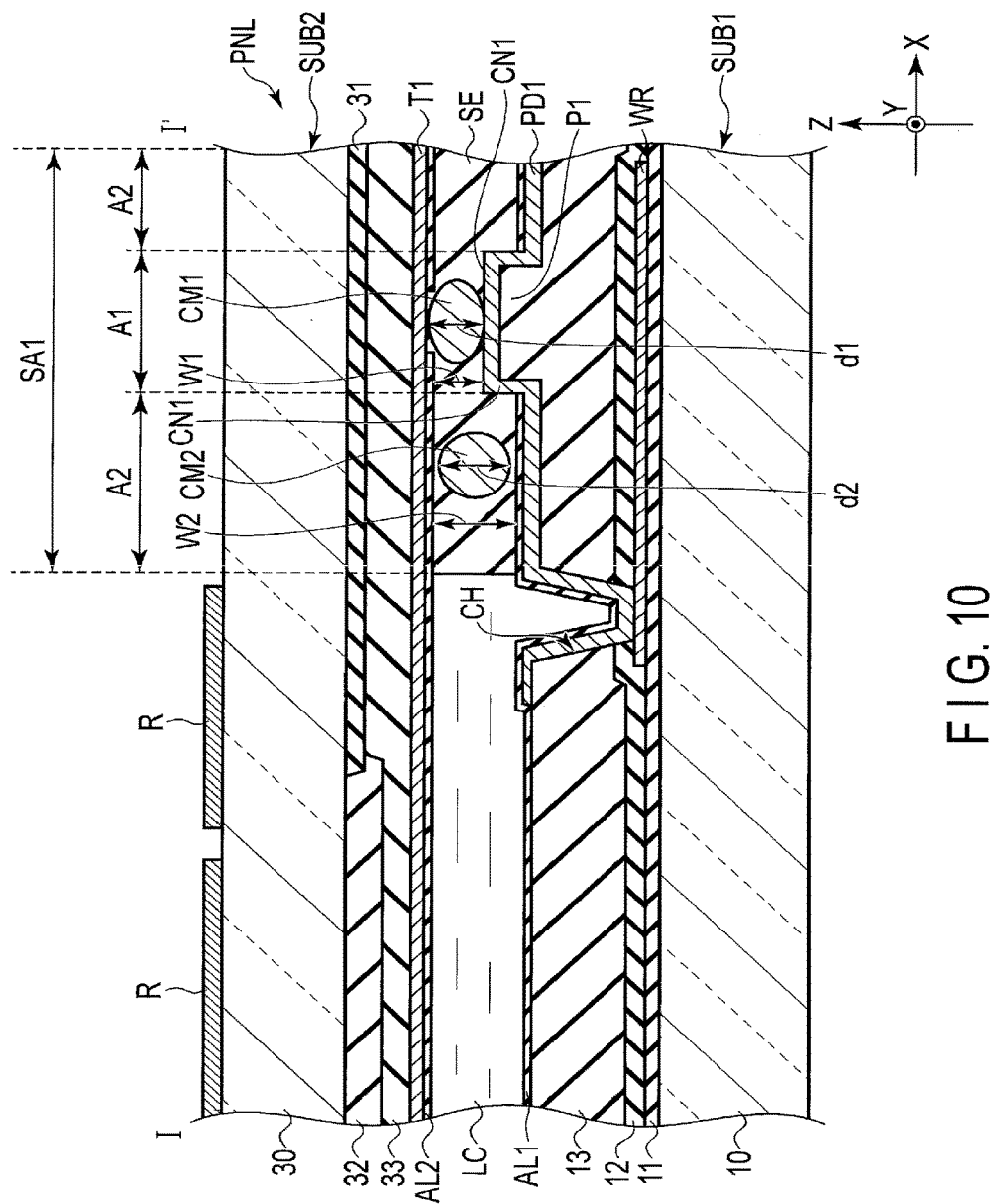
FIG. 10 is a cross-sectional view of a specific example of the display panel PNL of the embodiment.

FIG. 10 is a cross-sectional view of a specific example of the display panel PNL of the present embodiment.

The sealant SE includes a conductive material CM2 in addition to the conductive material CM1. The conductive material CM2 is conductive. The conductive material CM2 is disposed between the first alignment film AL1 and the electrode T1 in the second area A2. The conductive material CM2 may be apart from both the first alignment film AL1 and the electrode T1, or may be in contact with at least one of the first alignment film AL1 and the electrode T1, or may be in contact with the pad PD passing through the first alignment film AL1. The conductive material CM2 is formed in a sphere, is formed of the same material used for the conductive material CM1, and has a diameter along the first direction X which is equal to that of the conductive material CM1 before its crush.

The sealant SE has a thickness W1 between the connection CN1 and the electrode T1 in the first area A1. Furthermore, the sealant SE has a thickness W2 between the first alignment film AL1 and the electrode T1 in the second area A2. The thickness W1 is less than the thickness W2, and in the present embodiment, the thickness W1 is formed to be 0.9 times or less than the thickness W2.

The conductive material CM1 disposed between the connection CN1 and the electrode T1 has a thickness d1 which is substantially equal to the thickness W1 in the first area A1 of the sealant SE. The conductive material CM2 disposed between the first alignment film AL1 and the electrode T1 has a thickness d2 which is substantially equal to the thickness W2 in the second area A2 of the sealant SE. That is, the thickness d1 of the conductive material CM1 is less than the thickness d2 of the conductive material CM2, and in the present embodiment, the conductive material CM1 is crushed by 10% or more with respect to the thickness d2 of the conductive material CM2 which is substantially intact. The thickness d2 of the conductive material CM2 is preferably 1 to 7 µm, and in the example of FIG. 9, it is approximately 4 µm. Note that the thickness here corresponds to a length in the third direction Z.

In the above specific example, the above-described advantages can be achieved similarly.

Now, variations of the present embodiment will be explained.

Figure 11:
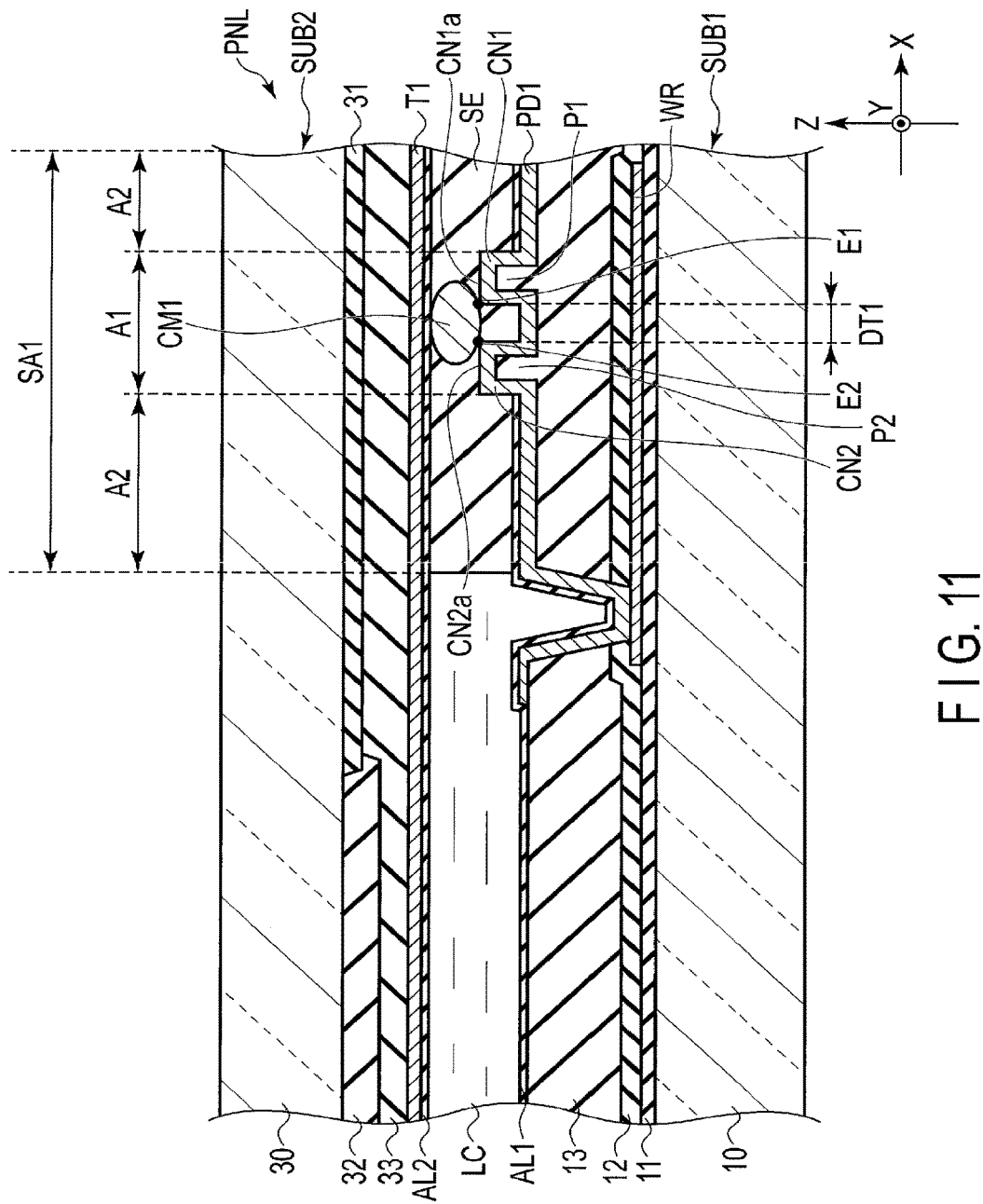
FIG. 11 is a cross-sectional view of the display panel PNL of a first variation of the embodiment.

FIG. 11 is a cross-sectional view of the display panel PNL of a first variation of the embodiment. In the display panel PNL of FIG. 11, a conductive material CM1 contacts a plurality of connections, namely, connections CN1 and CN2. In this respect, the display panel PNL of FIG. 11 differs from the display panel PNL of FIG. 9.

In the example depicted, the connections CN1 and CN2 are arranged in the first direction X at intervals. The structure of the connection CN1 is as explained with reference to FIG. 9, and the detailed description thereof will be omitted. The connection CN2 is structured as the connection CN1. An example of the connection CN2 will be briefly explained here. The third insulating film 13 further includes a projection P2 projecting toward the second substrate SUB2. The projections P1 and P2 are arranged in the first direction X. The pad PD1 further overlaps the projection P2. The connection CN2 includes the projection P2 and a part of the pad PD1 which overlaps the projection P2. In the present embodiment, a gap DT1 between the end E1 of the connection CN1 and the end E2 of the connection CN2 is formed less than the diameter of the conductive material CM1 in the long axis. For example, the gap DT1 is set to 0.5 to 5 µm.

The conductive material CM1 contacts both the connections CN1 and CN2. The electrode T1 is electrically connected to both the connections CN1 and CN2 through the conductive material CM1.

Note that the number of the connections which are brought in contact with a single conductive material is not limited, and three or more connections may be brought in contact with a single conductive material. Furthermore, in the example depicted, the conductive material CM1 contacts the upper surface CN1a of the connection CN1 and the upper surface CN2a of the connection CN2; however, the conductive material may contact not only the upper surfaces of the connections but also side surfaces in the circumference of each upper surface.

In such a first variation, the above-described advantages can be achieved. In addition, the connection structure is formed more finely than that of the example of FIG. 9. Thus, the area of the upper surface of each connection is made smaller, and the formation of the first alignment film AL1 on the upper surfaces becomes more difficult. Therefore, the conductance between the conductive material and the connections can be easily secured.

FIG. 12 is a cross-sectional view of the display panel PNL of a second variation of the embodiment. In the display panel PNL of FIG. 12, the second substrate SUB2 includes a connection CN3 which projects toward the first substrate SUB1. In this respect, the display panel PNL of FIG. 12 differs from that of FIG. 9. The connection CN3 is conductive and is disposed above the connection CN1.

The connection CN3 includes a projection P3 and an electrode T1 overlapping the projection P3. The projection P3 projects from the second substrate SUB2 toward the first substrate SUB1. In the example depicted, the projection P3 is a part of the overcoat layer 33. The overcoat layer 33 including the projection P3 can be formed in the same manner used in the formation of the third insulating film 13 described above. That is, for example, the overcoat layer 33 with the projection P3 can be formed using a positive resist as a material for the overcoat layer 33 and applying a half-tone exposure process during the formation of the overcoat layer 33. Alternatively, the projection P3 may be formed in the first area A1 by treating, for example, a light shielding layer 31 or a color filter 32 between the overcoat layer 33 and the second insulating substrate 30.

The electrode T1 is disposed on the overcoat layer 33 to be opposed to the first substrate SUB1. A part of the electrode T1 overlapping the projection P3 structures the connection CN3. Note that the alignment film AL2 is not formed on the connection CN3. The electrode T1 may be formed such that the part corresponding to the first area A1 becomes thicker than the part corresponding to the second area A2 to omit the projection P3. The conductive material CM1 is disposed between the connection CN1 and the connection CN3. The conductive material CM1 contacts the connections CN1 and CN3 and is electrically connected to both the connections CN1 and CN3. With the above structure, the electrode T1 is electrically connected to the connection line WR through the connection CN3, conductive material CM1, and connection CN1.

The sealant SE has a thickness W3 in the first area A1 between the connection CN1 and the connection CN3. The thickness W3 is less than the thickness W2, and for example, the thickness W3 is 0.9 times or less than the thickness W2, or preferably, is 0.1 times or more and 0.9 times or less than the thickness W2. That is, the conductive material CM1 is crushed by 10% or more (and preferably, 50% or less) with respect to the thickness of the conductive material CM2 which is substantially intact as in the above embodiment.

In such a second variation, the above-described advantages can be achieved. In addition, since the connection CN3 is disposed to be opposed to the connection CN1, a pressure crushing the conductive material CM1 therebetween can easily be applied, and the conductance between the conductive material CM1 and the connections CN1 and CN3 can be easily secured.

Alternatively, the connection CN1 in the first substrate SUB1 may be omitted and the connection CN3 in the second substrate SUB2 alone may be formed. In that case, the electrode T1 is electrically connected to the connection line WR through the connection CN3, conductive material CM1, and pad PD1.

Figure 13:
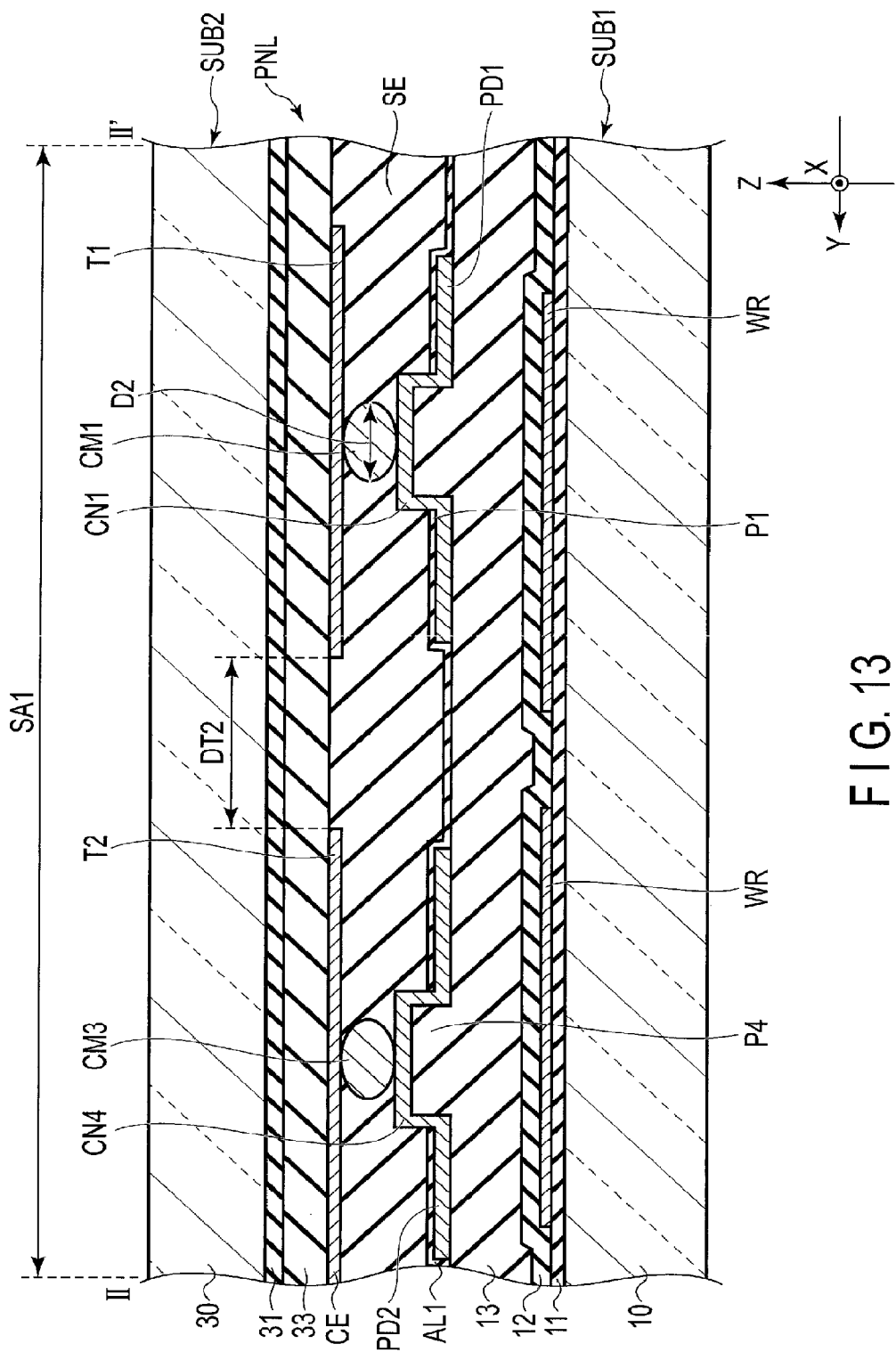
FIG. 13 is a cross-sectional view of the display panel PNL, taken along line II-II' of FIGS. 7 and 8.

FIG. 13 is a cross-sectional view of the display panel PNL, taken along line II-II' of FIGS. 7 and 8.

In the first substrate SUB1, connections CN1 and CN4 are arranged in the second direction Y at intervals. Although the details are omitted, the connection CN1 includes the projection P1 and the pad PD1 and the connection CN4 includes the projection P4 and the pad PD2. Note that, to prevent a short circuit between electrodes, a gap DT2 between the electrodes T1 and T2 should be set greater than the maximum diameter D2 of a conductive material in the first direction X.

In the second substrate SUB2, an electrode (first electrode) T1 and an electrode (second electrode) T2 are arranged in the second direction Y at intervals. The electrode T1 is positioned above the pad PD1 including the connection CN1 and the electrode T2 is positioned above the pas PD2 including the connection CN4.

The conductive material CM3 is interposed between the connection CN4 and the electrode 12 contacting the both.

The above structure corresponds to a case where the electrodes T1 and T2 adjacent in the second direction Y are electrically connected to corresponding connections CN1 and CN4 in the seal area SA1 which is disposed in one side of the display area DA.

FIG. 14 is a plan view of a first substrate SUB1 of a third variation of the embodiment. In the first substrate SUB1 of FIG. 14, elements such as pads PD and connection lines WR are formed in both sides of the display area DA. In this respect, the first substrate SUB1 of FIG. 14 differs from the first substrate SUB1 of FIG. 7.

The display area DA is adjacent to the seal area SA1 in one side DAa in the first direction X and is adjacent to the seal area SA2 in the other side DAb in the first direction X.

With respect to electrodes T1 to Tα arranged in the second direction Y of FIG. 8, pads PD1, PD3, . . . connected to the odd-numbered electrodes and connection lines WR connected to such pads are arranged in the seal area SA1, and pads PD2, PD4, . . . connected to even-numbered electrodes and connection lines WR connected to such pads are arranged in the seal area SA2. Each pad extends not only in corresponding seal area but also in the intra-seal area SI.

Note that the layout of pads PD and the like is not limited to the example depicted. For example, given that the display area DA is divided into the first area (upper half area) in the side apart from the common electrode drive circuit CD and the second area (lower half area) in the side close to the common electrode drive circuit CD, the electrodes disposed in the first area amongst electrodes T1 to Tα may be connected to the pads PD and connection lines WR in the seal area SA1 side, and the electrodes disposed in the second area amongst electrodes T1 to Tα may be connected to the pads and connection lines WR in the seal area SA2 side.

Furthermore, if electrodes T1 to Tα are arranged in the first direction X at intervals and extend substantially linearly in the second direction Y, and electrodes R1 to Rβ are arranged in the second direction Y at intervals and extend substantially linearly in the first direction X, the pads PD and connection lines WR may be formed in the seal area SA4 alone, which is close to the common electrode drive circuit CD, or may be formed in both the seal areas SA3 and SA4.

If the layout of FIG. 14 is adopted, the connection CN1 of FIG. 13 is formed in the seal area SA1 and the connection CN4 is formed in the seal area SA2. That is, the electrode T1 is electrically connected to the connection CN1 in the seal area SA1 and the electrode T2 is electrically connected to the connection CN4 in the seal area SA2.

In such a variation, the above-described advantages can be achieved. In addition, with such a layout of the pads PD and connection lines WR, the number of connection lines WR disposed in the seal area SA1 can be reduced as compared to the example of FIG. 7, and the same number of connection lines WR can be arranged in the seal areas SA1 and SA2. Therefore, the width of the non-display area NDA can be made uniform and a thin-bezel structure can be achieved.

Figure 15:
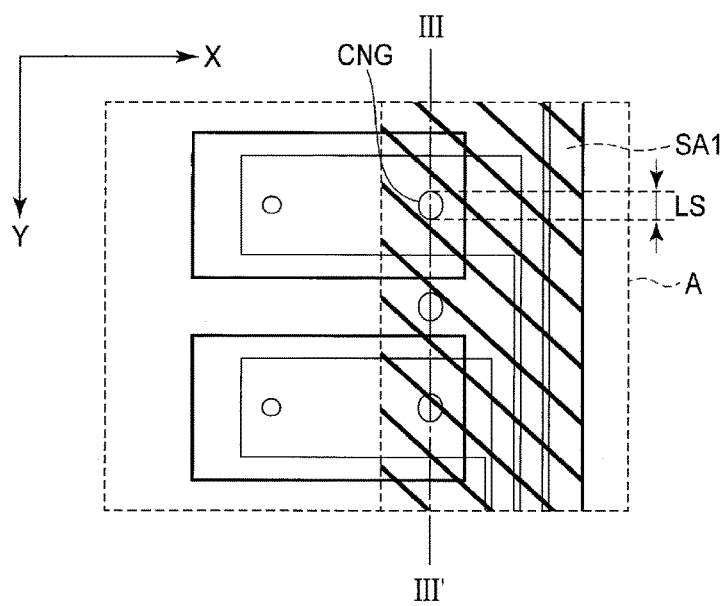
FIG. 15 is a plan view of an example of the structure of the area A of FIG. 7.

FIG. 15 is a plan view of an example of the structure of the area A of FIG. 7.

Connection groups CNG are disposed in the seal area SA1. A connection group CNG is composed of a plurality of connections and connection groups CNG are dispersed in the seal area SA. In the example depicted, the connection group CNG is formed in a substantial ellipse in a plan view which has its long axis in the second direction Y and its short axis in the first direction X. The connection group CNG has a long side diameter LS which is, for example, 0.5 mm or more (preferably, 0.5 mm or more and 3 mm or less). Note that the shape of the connection group CNG is not limited to the example depicted.

In a plan view, the total area of the connection groups CNG in the seal area SA1 is approximately 30% or less than the area of the seal area SA1. Therefore, unevenness in the gap caused by insufficient crush of the conductive materials reacting to the connection groups CNG when they are pressed can be suppressed.

Figure 16:
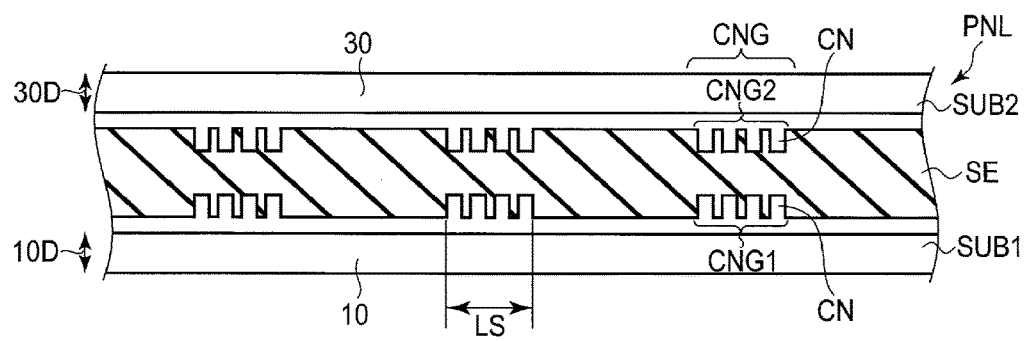
FIG. 16 is a cross-sectional view of the display panel PNL, taken along line III-III' of FIG. 15.

FIG. 16 is a cross-sectional view of the display panel PNL, taken along line III-III' of FIG. 15. In FIG. 16, the main part of the structure is schematically shown, and the detailed structure of the display panel PNL is omitted.

The first substrate SUB1 includes a plurality of connection groups CNG1. A connection group CNG1 is composed of a plurality of connections CN. The second substrate SUB2 includes a plurality of connection groups CNG2. A connection group CNG2 is composed of a plurality of connections CN. The connection groups CNG2 are opposed to the connection groups CNG1. Conductive materials which are not shown are interposed between the connection groups CNG1 and CNG2.

Note that the number of connection ON used in the connection groups CNG1 and CNG2 is optional. Furthermore, either connection groups CNG1 or connection groups CNG2 may be formed. Furthermore, a connection groups CNG1 has a long side diameter LS which is less than a thickness 10D of the first insulating substrate 10 of the first substrate SUB1 and a thickness 30D of the second insulating substrate 30 of the second substrate SUB2. In the example depicted, the thickness 10D and the thickness 30D are 0.15 to 0.5 mm. Therefore, even if a pressure is applied to the first insulating substrate 10 and the second insulating substrate 30 when the first substrate SUB1 and the second substrate SUB2 are adhered, a warp in the first insulating substrate 10 and the second insulating substrate 20 can be suppressed. Note that, in this example, the connection group CNG2 has a long side diameter which is substantially the same as the long side diameter LS of the connection group CNG1 in the same direction.

Figure 17:
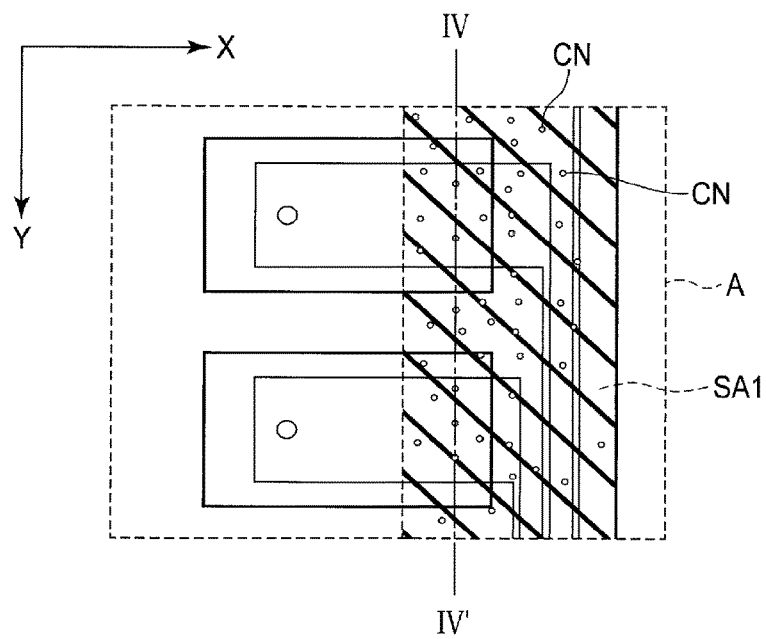
FIG. 17 is a plan view of another example of the structure of the area A of FIG. 7.

FIG. 17 is a plan view of another example of the structure of the area A of FIG. 7.

Connections CN are dispersed in the seal area SA1. In the example depicted, a connection CN corresponds to connection CN1 shown in FIG. 9 or the like. In the example of FIG. 17, in a plan view, the total area of the connections CN in the seal area SA1 is 30% or less (preferably, 10% or more and 30% or less) than the area of seal area SA1.

Figure 18:
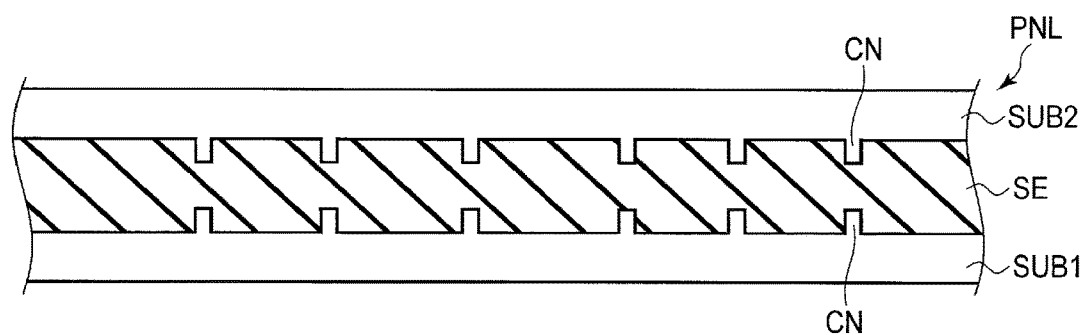
FIG. 18 is a cross-sectional view of the display panel PNL, taken along line IV-IV' of FIG. 17.

FIG. 18 is a cross-sectional view of the display panel PNL, taken along line IV-IV' of FIG. 17. The first substrate SUB1 includes a plurality of connections CN which are arranged at intervals. Furthermore, the second substrate SUB2 includes a plurality of connections CN which are arranged at intervals. The connections CN in the first substrate SUB1 and the connection CN in the second substrate SUB2 are opposed to each other and conductive materials which are not shown are interposed therebetween.

In such a structure, the advantages described above can be achieved.

Figure 19:
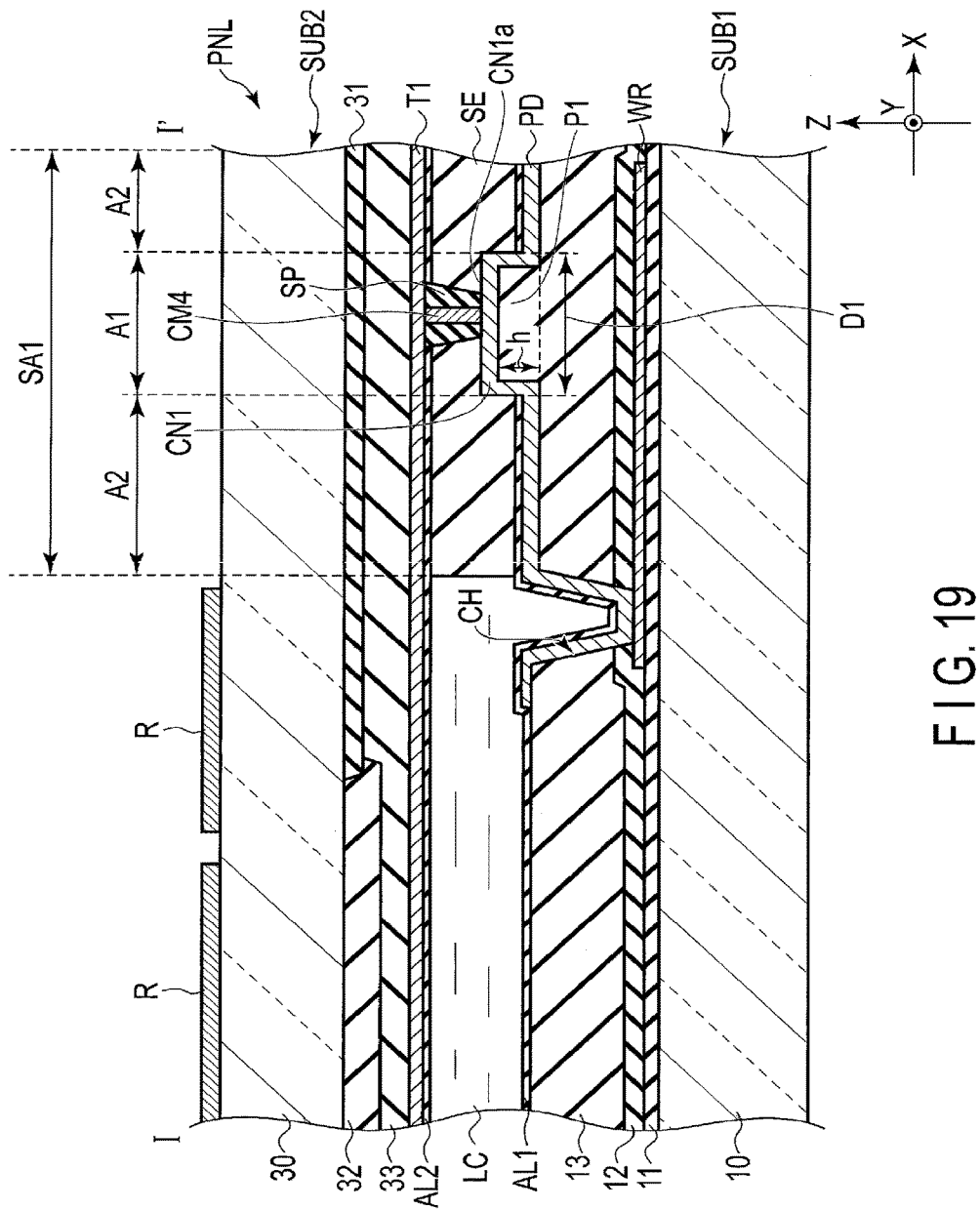
FIG. 19 is a cross-sectional view of the display panel PNL of a fourth variation of the embodiment.

FIG. 19 is a cross-sectional view of the display panel PNL of a fourth variation of the embodiment. The display panel PNL of FIG. 19 includes, instead of a conductive material CM1, a spacer SP interposed between a connection CN1 and an electrode T1 in a first area A1. In this respect, the display panel PNL of FIG. 19 differs from the display panel PNL of FIG. 9.

The spacer SP includes a contact hole therein which is pierced from the connection CN1 to the electrode T1, and a conductive material CM4 is filled in the contact hole. The conductive material CM4 contacts both the connection CN1 and the electrode T1 and electrically connects the both.

As can be understood from the above, the present embodiment can provide a liquid crystal display device which can suppress a loss in the production.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device including a first substrate, a second substrate opposed to the first substrate, a sealant which adheres the first substrate and the second substrate, and a display element layer sealed between the first substrate and the second substrate, the display device comprising:
   a drive circuit in one of the first substrate and the second substrate;
   a first electrode in the other of the first substrate and the second substrate;
   a first conductive material inside the sealant; and
   a first connection on a seal area which overlaps the sealant on the first substrate and projects toward the second substrate, the first connection being conductive, wherein
   the first electrode is electrically connected to the drive circuit through the first connection and the first conductive material,
   the second substrate includes a second connection projecting toward the first substrate, the second connection being conductive, and
   the first conductive material is disposed between the first connection and the second connection.

2. The display device of claim 1, wherein
   an alignment film is formed on the seal area,
   the seal area includes a first area in which the first connection is formed and a second area which is a circumference of the first connection,
   the alignment film is formed in the second area, and
   the alignment film is not formed in the first area, or the alignment film is formed in the first area such that a thickness thereof is smaller than that of the alignment film in the second area.

3. The display device of claim 2, comprising a second conductive material inside the sealant, wherein
   the first conductive material in the first area in which the first connection is formed has a thickness less than that of the second conductive material in the second area which is a circumference of the first connection in the seal area.

4. The display device of claim 2, wherein the sealant in the first area in which the first connection is formed has a thickness which is 0.9 times or less the thickness of the sealant in the second area which is a circumference of the first connection in the seal area.

5. The display device of claim 1, wherein the first conductive material contacts a plurality of first connections.

6. The display device of claim 1, wherein one of the first substrate and the second substrate includes a switching element and a pixel electrode which is connected to the switching element, and
   the first electrode is opposed to the pixel electrode to form a field therebetween.

7. The display device of claim 6, wherein the first electrode is used as a drive electrode for detection of a position of an object.

8. The display device of claim 1, wherein the first connection has a maximum diameter in a first direction which is 0.5 times or more to 10 times or less the maximum diameter in the first direction of the first conductive material.

9. The display device of claim 1, wherein the sealant is formed as a continuous loop.

10. The display device of claim 1, further comprising:
    a second electrode on the same substrate in which the first electrode is disposed;
    a third conductive material inside the sealant; and
    a third connection in the seal area which overlaps the sealant on the first substrate and projects toward the second substrate, the third connection being conductive, wherein
    the second electrode is electrically connected to the drive circuit through the third connection and the third conductive material.

11. The display device of claim 10, wherein the first electrode and the second electrode extend in a second direction and are arranged in a third direction which crosses the second direction in a display area, the display area is adjacent to the seal area in both sides of the second direction, and the first connection is formed in the seal area in one side of the second direction and the third connection is formed in the seal area in the other side of the second direction.

12. The display device of claim 2, comprising a second conductive material disposed inside the sealant, wherein the first conductive material in the first area in which the first connection is formed has a thickness less than that of the second conductive material in the second area which is a circumference of the first connection in the seal area.

13. The display device of claim 2, wherein the sealant in the first area in which the first connection is formed has a thickness which is 0.9 times or less the thickness of the sealant in the second area which is a circumference of the first connection in the seal area.

14. The display device of claim 2, wherein the first conductive material contacts a plurality of first connections.

15. The display device of claim 2, wherein one of the first substrate and the second substrate includes a switching element and a pixel electrode which is connected to the switching element, and the first electrode is opposed to the pixel electrode to form a field therebetween.

16. The display device of claim 3, wherein the sealant in the first area in which the first connection is formed has a thickness which is 0.9 times or less the thickness of the sealant in the second area which is a circumference of the first connection in the seal area.

17. The display device of claim 3, wherein the first conductive material contacts a plurality of first connections.

18. The display device of claim 3, wherein one of the first substrate and the second substrate includes a switching element and a pixel electrode which is connected to the switching element, and the first electrode is opposed to the pixel electrode to form a field therebetween.

19. The display device of claim 4, wherein the first conductive material contacts a plurality of first connections.

* * * * *